US012731812B2

(12) United States Patent
Yushin et al.

(10) Patent No.: US 12,731,812 B2
(45) **Date of Patent: *Sep. 8, 2026**

(54) ELECTROLYTES FOR IMPROVED PERFORMANCE OF CELLS WITH HIGH-CAPACITY ANODES BASED ON MICRON-SCALE MODERATE VOLUME-CHANGING PARTICLES

(71) Applicant: Sila Nanotechnologies, Inc., Alameda, CA (US)

(72) Inventors: Gleb Yushin, Atlanta, GA (US); Ashleigh Ward, Oakland, CA (US); Gregory Roberts, Alameda, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 18/334,097

(22) Filed: Jun. 13, 2023

(65) Prior Publication Data

US 2023/0327179 A1 Oct. 12, 2023

Related U.S. Application Data

(63) Continuation of application No. 17/453,777, filed on Nov. 5, 2021, now Pat. No. 11,710,846, which is a (Continued)

(51) Int. Cl.

| | |
|---|---|
| ***H01M 10/052*** | (2010.01) |
| ***H01M 4/02*** | (2006.01) |
| ***H01M 4/38*** | (2006.01) |
| ***H01M 10/0561*** | (2010.01) |
| ***H01M 10/0567*** | (2010.01) |
| ***H01M 10/0568*** | (2010.01) |
| ***H01M 10/0569*** | (2010.01) |
| ***H01M 10/42*** | (2006.01) |

(52) U.S. Cl.
CPC ......... *H01M 10/052* (2013.01); *H01M 4/386* (2013.01); *H01M 10/0561* (2013.01); (Continued)

(58) Field of Classification Search
CPC ........... H01M 4/386; H01M 2004/021; H01M 10/0569; H01M 10/0568; H01M 10/0567; (Continued)

(56) References Cited

U.S. PATENT DOCUMENTS

2005/0233220 A1* 10/2005 Gozdz ............... H01M 10/0525 429/231.95
2007/0166617 A1* 7/2007 Gozdz ................. H01M 4/5825 429/231.95
(Continued)

*Primary Examiner* — Imran Akram
(74) *Attorney, Agent, or Firm* — MUNCY, GEISSLER, OLDS & LOWE, P.C.; Daniel Podhajny

(57) ABSTRACT

A metal-ion battery cell is provided that comprises anode and cathode electrodes, a separator, and an electrolyte. The anode electrode may, for example, have a capacity loading in the range of about 2 $mAh/cm^2$ to about 10 $mAh/cm^2$ and comprise anode particles that (i) have an average particle size in the range of about 0.2 microns to about 40 microns, (ii) exhibit a volume expansion in the range of about 8 vol. % to about 180 vol. % during one or more charge-discharge cycles of the battery cell, and (iii) exhibit a specific capacity in the range of about 600 mAh/g to about 2600 mAh/g. The electrolyte may comprise, for example, (i) one or more metal-ion salts and (ii) a solvent composition that comprises one or more low-melting point solvents that each have a melting point below about −70° C. and a boiling point above about +70° C.

23 Claims, 9 Drawing Sheets

Related U.S. Application Data continuation of application No. 15/873,850, filed on Jan. 17, 2018, now Pat. No. 11,177,500.

(60) Provisional application No. 62/447,028, filed on Jan. 17, 2017.

(52) U.S. Cl.
CPC ... *H01M 10/0567* (2013.01); *H01M 10/0569* (2013.01); *H01M 2004/021* (2013.01); *H01M 2004/027* (2013.01); *H01M 10/0568* (2013.01); *H01M 2010/4292* (2013.01); *H01M 2300/0025* (2013.01); *H01M 2300/0028* (2013.01); *H01M 2300/0034* (2013.01)

(58) Field of Classification Search
CPC ... H01M 2004/027; H01M 2300/0025; H01M 2300/0028; H01M 2300/0034
See application file for complete search history.

(56) References Cited

U.S. PATENT DOCUMENTS

| | | | | |
|---|---|---|---|---|
| 2012/0100417 | A1* | 4/2012 | Ramprasad | H01M 10/0567 429/188 |
| 2014/0138575 | A1* | 5/2014 | Noguchi | H01M 10/0525 252/182.1 |
| 2014/0170524 | A1* | 6/2014 | Chiang | H01M 8/18 429/482 |
| 2014/0315097 | A1* | 10/2014 | Tan | H01M 10/052 429/300 |
| 2015/0236372 | A1* | 8/2015 | Yushin | H01M 4/366 156/60 |
| 2015/0280221 | A1* | 10/2015 | Abdelsalam | H01M 4/583 429/232 |
| 2017/0170477 | A1* | 6/2017 | Sakshaug | C04B 38/0064 |
| 2017/0229704 | A1* | 8/2017 | Takahashi | H01M 10/0585 |
| 2018/0026256 | A1* | 1/2018 | Inoue | H01M 50/581 429/61 |
| 2018/0248220 | A1* | 8/2018 | Manabe | H01M 4/131 |

* cited by examiner

ELECTROLYTES FOR IMPROVED PERFORMANCE OF CELLS WITH HIGH-CAPACITY ANODES BASED ON MICRON-SCALE MODERATE VOLUME-CHANGING PARTICLES

CROSS-REFERENCE TO RELATED APPLICATIONS

The present application for patent is a Continuation of U.S. Non-Provisional application Ser. No. 17/453,777, entitled "Electrolytes for Improved Performance of Cells with High-Capacity Anodes based on Micron-Scale Moderate Volume-Changing Particles," filed Nov. 5, 2021, which is a Continuation of U.S. Non-Provisional application Ser. No. 15/873,850, entitled "Electrolytes for Improved Performance of Cells with High-Capacity Anodes based on Micron-Scale Moderate Volume-Changing Particles," filed Jan. 17, 2018, which in turn claims the benefit of U.S. Provisional Application No. 62/447,028, entitled "Electrolytes for Improved Performance of Cells with High-Capacity Anodes based on Micron-Scale Moderate Volume-Changing Particles," filed Jan. 17, 2017, each of which is expressly incorporated herein by reference in its entirety.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for potential applications in low- or zero-emission, hybrid-electrical or fully-electrical vehicles, consumer electronics, wearable devices, energy-efficient cargo ships and locomotives, drones, aerospace applications, and power grids. In particular, further improvements are desired for various rechargeable batteries, such as rechargeable metal and metal-ion batteries (e.g., Li and Li-ion batteries, rechargeable Na and Na-ion batteries, and rechargeable Mg and Mg-ion batteries, etc.), rechargeable aqueous batteries, rechargeable alkaline batteries, rechargeable metal hydride batteries, and lead acid batteries, to name a few.

A broad range of electrolyte compositions may be utilized in the construction of Li and Li-ion batteries. However, for improved cell performance (e.g., low and stable resistance, high cycling stability, high rate capability, etc.), the type of electrolyte needs to be carefully selected for use with specific types and specific sizes of active particles in both the anode and cathode, as well as the specific operational conditions (e.g., temperature, charge rate, discharge rate, voltage range, capacity utilization, etc.). In many cases, the choice of electrolyte components and their ratios in the electrolyte composition is not trivial and can be counter-intuitive.

In many different types of rechargeable batteries, charge storing anode materials may be produced as high-capacity (nano)composite (composite or nanocomposite) powders, which exhibit moderately high volume changes (e.g., 8-180 vol. %, or an increase of 8%-180% by volume of individual composite particles) during the first charge-discharge cycle and moderate volume changes (e.g., 5-50 vol. %, or an increase of 5%-50% by volume of individual particles) during the subsequent charge-discharge cycles. A subset of such charge-storing anode particles includes anode particles with an average size in the range of around 0.2 to around 20 microns. Such a class of charge-storing particles offers great promises for scalable manufacturing and achieving high cell-level energy density and other performance characteristics. However, such particles are relatively new and their formation into electrodes using conventional electrolytes may result in relatively poor cell performance characteristics and limited cycle stability. Cell performance may become particularly poor when the high-capacity (nano)composite anode capacity loading (areal capacity) becomes moderate (e.g., 2-4 $mAh/cm^2$, with the most common capacity loading in many commercial applications being in the range of around 3 to around 3.5 $mAh/cm^2$) or even more so when the high-capacity (nano)composite anode capacity loading becomes high (e.g., 4-10 $mAh/cm^2$). Higher capacity loading, however, may be advantageous in certain applications for increasing cell energy density and reducing cell manufacturing costs. Similarly, cell performance may become inferior when the porosity of such an anode (the volume occupied by the spacing between the (nano)composite active anode particles in the electrode and filled with electrolyte) becomes moderately small (e.g., 25-35 vol. % after the first charge-discharge cycle) and more so when the porosity becomes small (e.g., 5-25 vol. % after the first charge-discharge cycle) or when the amount of the binder in the electrode becomes moderately small (e.g., 5-14 wt. %) and more so when the amount of the binder in the electrode becomes small (e.g., 1-5 wt. %). Higher electrode density and lower binder content, however, may be advantageous in certain applications for increasing cell energy density and reducing cost. Lower binder content may also be advantageous in certain applications for increasing cell rate performance.

Examples of materials that exhibit moderately high volume changes (e.g., 8-180 vol. %) during the first charge-discharge cycle and moderate volume changes (e.g., 5-50 vol. %) during the subsequent charge-discharge cycles include (nano)composites comprising so-called conversion-type active electrode materials (which include both so-called chemical transformation and so-called "true conversion" sub-classes) and so-called alloying-type active electrode materials. In the case of metal-ion batteries (such as Li-ion batteries), examples of such conversion-type active electrode materials include, but are not limited to, metal fluorides (such as lithium fluoride, iron fluoride, cupper fluoride, bismuth fluorides, their mixtures and alloys, etc.), metal chlorides, metal iodides, metal chalcogenides (such as sulfides, including lithium sulfide and other metal sulfides), sulfur, metal oxides (including but not limited to lithium oxide and silicon oxide), metal nitrides, metal phosphides (including lithium phosphide), metal hydrides, and others. In the case of metal-ion batteries (such as Li-ion batteries), examples of such alloying-type electrode materials include, but are not limited to, silicon, germanium, antimony, aluminum, magnesium, zinc, gallium, arsenic, phosphorous, silver, cadmium, indium, tin, lead, bismuth, their alloys, and others. These materials may offer higher gravimetric and volumetric capacity than so-called intercalation-type electrodes used in commercial Li-ion batteries. Alloying-type electrode materials may be particularly advantageous for use in high-capacity anodes for Li-ion batteries. Silicon-based alloying-type anodes may be particularly attractive for such applications. Conversion-type electrodes may also be used in various aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

Accordingly, there remains a need for improved batteries, components, and other related materials and manufacturing processes.

SUMMARY

Embodiments disclosed herein address the above stated needs by providing improved batteries, components, and other related materials and manufacturing processes.

As an example, a metal-ion battery cell is provided that comprises anode and cathode electrodes, a separator electrically separating the anode electrode and the cathode electrode, and an electrolyte ionically coupling the anode electrode and the cathode electrode. The anode electrode may, for example, have a capacity loading in the range of about 2 $mAh/cm^2$ to about 10 $mAh/cm^2$ and comprise anode particles that (i) have an average particle size in the range of about 0.2 microns to about 40 microns, (ii) exhibit a volume expansion in the range of about 8 vol. % to about 180 vol. % during one or more charge-discharge cycles of the battery cell, and (iii) exhibit a specific capacity in the range of about 600 mAh/g to about 2600 mAh/g. The electrolyte may comprise, for example, (i) one or more metal-ion salts and (ii) a solvent composition that comprises one or more low-melting point solvents that each have a melting point below about −70° C. and a boiling point above about +70° C.

In some designs, the average particle size may be in the range of about 0.4 microns to about 20 microns. In some designs, the anode particles may have a specific surface area in the range of about 0.3 $m^2/g$ to about 60 $m^2/g$.

The one or more low-melting point solvents may comprise, for example, one or more phosphorous-comprising solvents, one or more esters, one or more ethers, one or more fluorinated solvents, or a combination thereof. For example, the one or more low-melting point solvents may comprise the one or more esters. In some designs, at least about 50 vol. % of the one or more esters may have a carbon backbone with five carbon atoms.

The one or more low-melting point solvents constitute, for example, a volume fraction of the solvent composition that is in the range of about 30 vol. % to about 70 vol. %. In some designs, the one or more low-melting point solvents may constitute a volume fraction of the solvent composition that is in the range of about 40 vol. % to about 60 vol. %.

The solvent composition may further comprise two or more regular-melting point solvents, in addition to the one or more low-melting point solvents, that each have a melting point above about −60° C. The two or more regular-melting point solvents may constitute, for example, a volume fraction of the solvent composition that is at least about 30 vol. %. The two or more regular-melting point solvents may comprise two or more solvents selected from the group consisting of: carbonates, sulfones, lactones, phosphorus-comprising solvents, silicon-comprising solvents, sulfur-comprising solvents, esters, or a combination thereof.

As an example, the two or more regular-melting point solvents may comprise one or more linear carbonates and one or more cyclic carbonates. As another example, the two or more regular-melting point solvents may comprise a fluorinated solvent that constitutes a volume fraction of the solvent composition that is in the range of about 1 vol. % to about 20 vol. %. As another example, the two or more regular-melting point solvents may comprise a phosphorous-based solvent that constitutes a volume fraction of the solvent composition that is in the range of about 0.1 vol. % to about 5 vol. %. As another example, the two or more regular-melting point solvents may comprise a vinylene carbonate solvent that constitutes a volume fraction of the solvent composition that is in the range of about 0.1 vol. % to about 3 vol. %.

In some designs, the one or more metal-ion salts may be present in the electrolyte at a concentration in the range of about 1.2M to about 2M. In some designs, the one or more metal-ion salts may comprise $LiPF_6$, LiBOB, LiFSI, or a combination thereof. In some designs, the one or more metal-ion salts may comprise two or more metal-ion salts. As an example, the two or more metal-ion salts may comprise (i) a first metal-ion salt including a first metal ion species and (ii) a second metal-ion salt including a second metal ion species, with the first and second metal ion species being the same. As another example, the two or more metal-ion salts may comprise (i) a first metal-ion salt including a first metal ion species and (ii) a second metal-ion salt including a second metal ion species, with the first and second metal ion species being different.

In some designs, the battery cell may exhibit a charging potential of at least about 4.3V. In some designs, the anode particles may be composite particles that comprise silicon. In some designs, the anode electrode may further comprise a water-soluble binder.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
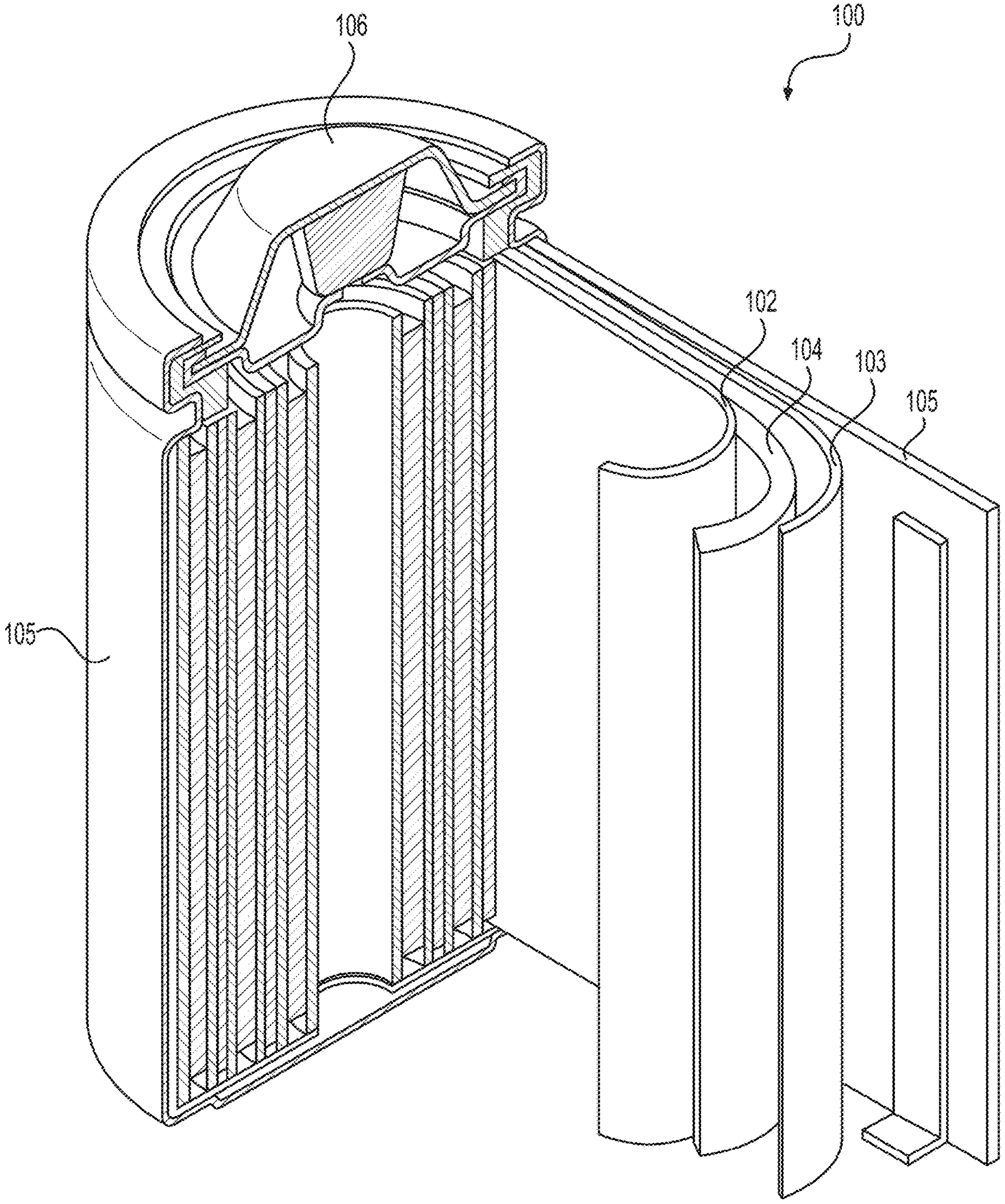
FIG. 1 illustrates an example metal-ion (e.g., Li-ion) battery in which the components, materials, methods, and other techniques described herein, or combinations thereof, may be applied according to various embodiments of the disclosure.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, and other metal and metal-ion batteries, alkaline batteries, etc.). Further, while the description below may also describe certain examples of the material formulations in a Li-free state (for example, as in silicon-comprising nanocomposite anodes), it will be appreciated that various aspects may be applicable to Li-containing electrodes (for example, partially or fully lithiated Si (or Si alloy) comprising anodes, partially or fully lithiated silicon oxide ($SiO_x$) comprising anodes (which also comprise Si atoms as active or Li-storing material), partially or fully lithiated metal fluorides comprising cathodes (e.g., mixtures or composites comprising LiF and metals such as Cu, Fe, Cu—Fe alloys, etc.), $Li_2S$, etc.).

Further, while the description below may describe certain examples in the context of some specific alloying-type and conversion-type chemistries of anode and cathode active materials for Li-ion batteries (such as silicon-comprising anodes or metal fluoride-comprising or lithium sulfide-comprising cathodes), it will be appreciated that various aspects may be applicable to other chemistries for Li-ion batteries (e.g., other conversion-type and alloying-type electrodes as well as various intercalation-type electrodes) as well as to other battery chemistries. In the case of metal-ion batteries (such as Li-ion batteries), examples of other suitable conversion-type electrodes include, but are not limited to, metal chlorides, metal iodides, sulfur, selenium, metal oxides, metal nitrides, metal phosphides, metal hydrides, and others.

During battery (such as a Li-ion battery) operation, conversion materials change (convert) from one crystal structure to another (hence the name "conversion"-type). During (e.g., Li-ion) battery operation, Li ions are inserted into alloying type materials forming lithium alloys (hence the name "alloying"-type). Sometimes, "alloying"-type electrode materials are considered to be a sub-class of "conversion"-type electrode materials.

While the description below may describe certain examples in the context of metal-ion batteries, other conversion-type electrodes that may benefit from various aspects of the present disclosure include various chemistries used in a broad range of aqueous batteries, such as alkaline batteries, metal hydride batteries, lead acid batteries, etc. These include, but are not limited to, various metals (such as iron, zinc, cadmium, lead, indium, etc.), metal oxides, metal hydroxides, metal oxyhydroxides, and metal hydrides, to name a few.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown explicitly) impregnating the separator 104, a battery case 105, and a sealing member 106 sealing the battery case 105.

Both liquid and solid electrolytes may be used for the designs herein. Conventional electrolytes for Li or Na-based batteries of this type may be composed of 0.8-1.2 M (1M±0.2 M) solution of a single Li or Na metal-ion salt (such as $LiPF_6$ for Li-ion batteries and $NaPF_6$ or $NaClO_4$ salts for Na-ion batteries) in a mixture of carbonate solvents with 1-2 wt. % of other organic additives. In particular, conventional electrolytes for Li or Na-based batteries as shown in FIG. 1 may include a 0.8-1M single salt concentration is. Other suitable organic additive solvents to the electrolyte may include nitriles, esters, sulfones, sulfoxides, phosphorous-based solvents, silicon-based solvents, ethers, and others. Such additive solvents may be modified (e.g., be sulfonated or fluorinated) in the designs described herein.

A conventional salt used in a Li-ion battery electrolyte is $LiPF_6$. Other salts that may be used in electrolyte (which are not necessarily conventional) include: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$, lithium difluoro(oxalate) borate ($LiBF_2(C_2O_4)$)), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)$ $SO_2CF_3$, $C_6F_5SO_2N^-(Li^+)SO_2C_6F_5$ or $CF_3SO_2N^-(Li^+)SO_2PhCF_3$, and others), and others.

Electrodes utilized in Li-ion batteries may be produced by (i) formation of a slurry comprising active materials, conductive additives, binder solutions and, in some cases, surfactant or other functional additives; (ii) casting a slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type. Metal ions are intercalated into and occupy the interstitial positions of such materials during the charge or discharge of a battery. Such anodes experience relatively small volume changes when used in electrodes. Polyvinylidene fluoride, or polyvinylidene difluoride (PVDF) soluble in an organic solvent such as N-methyl-2-pyrrolidone (NMP), and carboxymethyl cellulose (CMC) soluble in water are two binders that may be used in these electrodes. Carbon black is a conductive additive that may be used in these electrodes. However, such anodes exhibit relatively small gravimetric and volumetric capacities (e.g., less than 370 mAh/g rechargeable specific capacity in the case of graphite or hard carbon-based anodes and less than 600 $mAh/cm^3$ rechargeable volumetric capacity).

Alloying-type anode materials for use in Li-ion batteries may offer higher gravimetric and volumetric capacities compared to intercalation-type anodes in certain applications. For example, silicon (Si) offers approximately 10 times higher gravimetric capacity and approximately 3 times higher volumetric capacity compared to an intercalation-type graphite (or graphite-like) anode. However, in certain applications, Si may suffer from significant volume expansion during Li insertion (e.g., up to approximately 300 vol. %) and thus may induce thickness changes and mechanical failure of Si-comprising anodes. In addition, in certain applications, Si (and some Li—Si alloy compounds that may form during lithiation of Si) may suffer from relatively low electrical conductivity and relatively low ionic (Li-ion) conductivity. Electric and ionic conductivity of Si is lower than that of graphite. In some embodiments, formation of (nano)composite Si-comprising particles (including, but not limited to Si—C composites, Si-metal composites, Si-polymer composites, Si-ceramic composites, or other types of porous composites comprising nanostructured Si or nano-structured or nano-sized Si particles of various shapes and forms) may reduce volume changes during Li-ion insertion and extraction, which, in turn, may lead to better cycle stability in rechargeable Li-ion cells.

In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others.

In addition to (nano)composite anodes comprising alloying-type active materials, other suitable types of high capacity (nano)composite anodes may comprise metal oxides (including silicon oxide, lithium oxide, etc.), metal nitrides, metal phosphides (including lithium phosphide), metal hydrides, and others.

In particular, high-capacity (e.g., greater than around 600 mAh/g) (nano)composite anode powders, which exhibit moderately high volume changes (e.g., 8-180 vol. %) during the first charge-discharge cycle, moderate volume changes (e.g., 4-50 vol. %) during the subsequent charge-discharge cycles, an average size in the range of around 0.2 to around 40 microns (more preferably from around 0.4 to around 20 microns) and specific surface area in the range of around 0.3 to around 60 $m^2/g$ (more preferably from around 1 to around 30 $m^2/g$) may be advantageous for certain battery applications in terms of manufacturability and performance characteristics. Electrodes with electrode capacity loading from moderate (e.g., 2-4 $mAh/cm^2$) to high (e.g., 4-10 $mAh/cm^2$) are particularly advantageous for use in certain cells (although some cells with lower capacity loadings may be suitable in some designs and applications). Electrodes produced from aqueous slurries (using water-soluble (preferably with a solubility of more than around 1 mg-polymer binder per 1 ml-water (1 mg/ml), or more preferably with a solubility above around 10 mg/ml) binders that typically exhibit smaller swelling in most electrolyte solvents and, in some designs, stronger bonding to some of the active particles) are particularly advantageous for use in certain cells (although some anodes produced with non-aqueous slurries may be suitable in some designs and applications). Examples of such water-soluble binders include, but are not limited to various polymers and copolymers comprising polyvinylpyrrolidone (PVP) polymers and their various salts, carboxymethyl cellulose (CMC) and its various salts, styrene-butadiene rubbers (SBR), various polyvinyl alcohols (PVA) with various degrees of hydrolysis and polyvinyl acetate, polyacrylic acid (PAA) and its various salts, alginic acid and its various salts, and various combinations thereof, among others. Furthermore, in an example, a near-spherical (spheroidal) shape of the (nano)composite anode powder may improve rate performance and volumetric capacity of the anodes in certain applications. It may also be advantageous in some designs to utilize (nano)composite anode powders that comprise virtually no (e.g., 0-1 at. %) vanadium (V), manganese (Mn), iron (Fe), cobalt (Co) and nickel (Ni) atoms in the surface layer (e.g., the top or outer 2-5 nm layer of the anode particles) that get in contact with electrolyte during cycling. Finally, it may also be advantageous in some designs to utilize (nano)composite anode powders that comprise 5-100 at. % carbon (C) atoms in the surface layer (e.g., the top or outer 2-5 nm layer of the anode particles). In addition to some improvements that may be achieved with the formation and utilization of such alloying-type or conversion-type nanocomposite anode materials as well as electrode formulations, additional improvements in cell performance characteristics may also be achieved with improved composition and preparation of electrolytes.

However, high-capacity (nano)composite anode and cathode powders, which exhibit moderately high volume changes (e.g., 8-180 vol. %) during the first charge-discharge cycle, moderate volume changes (e.g., 4-50 vol. %) during the subsequent charge-discharge cycles, an average size in the range of around 0.2 to around 20 microns, virtually no (e.g., 0-1 at. %) V, Mn, Fe, Co and Ni atoms in the anode powder surface layer, relatively low density (e.g., 0.5-3.8 g/cc) and specific surface area in the range of around 1 to around 30 $m^2/g$, are relatively new and their formation into electrodes and use in cells (e.g., particularly with conventional electrolytes) may result in relatively poor cell performance characteristics and limited cycle stability, particularly if electrode capacity loading is moderate (e.g., 2-4 $mAh/cm^2$) and even more so if it is high (e.g., 4-10 $mAh/cm^2$). Higher capacity loading, however, is advantageous in certain applications for increasing cell energy density and reducing cell manufacturing costs. Similarly, the cell performance may be reduced when such an electrode (e.g., anode) porosity (e.g., volume occupied by the spacing between the (nano)composite active anode particles in the electrode and filled with electrolyte) becomes moderately small (e.g., 25-35 vol. %) and more so when the porosity becomes small (e.g., 5-25 vol. %) or when the amount of the binder in the electrode becomes moderately small (e.g., 5-14 wt. %) and more so when the amount of the binder becomes small (e.g., 1-5 wt. %). Higher electrode density and lower binder content, however, may be advantageous for increasing cell energy density and reducing cost in certain applications. Lower binder content may also be advantageous for increasing cell rate performance in certain applications. Larger volume changes may reduce cell performance, which may be related to damage in the solid electrolyte interphase (SEI) layer formed on the anode, to the non-uniform lithiation and de-lithiation of the electrode particles within the electrodes, and other factors. As will be described below in more detail, embodiments of the present disclosure may be used to mitigate some or all of such limitations.

In an embodiment of the present disclosure, electrolyte compositions that work well for intercalation-type anode and cathode electrodes (of various particle size) as well as electrolytes that work well for nano-sized (e.g., in the range of 1 nm to 200 nm) conversion-type anode and cathode electrodes or nano-sized alloying-type anodes, may perform relatively poorly in cells comprising certain high-capacity (nano)composite anode powders, such as high-capacity (nano)composite anode powders which exhibit moderately high volume changes (e.g., 8-180 vol. %) during the first charge-discharge cycle, moderate volume changes (e.g., 4-50 vol. %) during the subsequent charge-discharge cycles, surface area in the range of around 1 to around 30 $m^2/g$ and an average size in the range of around 0.2 to around 40 microns. Furthermore, electrolytes which may perform relatively poorly in cells with conventional nano-sized (e.g., in the range of 1 nm to 200 nm) alloying-type anodes may perform better in cells comprising certain high-capacity (nano)composite anode powders, such as high-capacity (nano)composite anode powders which exhibit moderately high volume changes (e.g., 8-180 vol. %) during the first charge-discharge cycle, moderate volume changes (e.g., 4-50 vol. %) during the subsequent charge-discharge cycles, surface area in the range of around 1 to around 30 $m^2/g$ and an average size in the range of around 0.2 to around 40 microns. For example, the larger size of such composites and the larger volume changes in such composites may lead to poorer performance characteristics when used in combination with certain electrolyte compositions (e.g., those conventionally used with nanosized conversion-type anode and cathode electrodes or alloying-type anodes).

In at least one embodiment of the disclosure, the impact of changes in the electrolyte composition on the otherwise improved cell performance associated with such (nano) composite anodes may be particularly strong for certain anodes that use alloying-type anode materials. In particular, selecting particular electrolyte compositions for use with a sub-class of such anode powders with specific surface area in the range of around 0.3 $m^2/g$ to around 60 $m^2/g$ may help to facilitate formation of suitable cells with higher stability, higher energy density, as well as improvements to other performance characteristics. In an example, for alloying-type anode materials that comprise silicon (Si), (nano) composite electrodes with gravimetric capacities in the range of around 600 mAh/g to around 2400 mAh/g (normalized by the total mass of (nano)composite particles, binders and conductive additives combined) and preferably comprising virtually no (e.g., 0-1 at. %) V, Mn, Fe, Co and Ni atoms may be used. In this case, the electrolyte compositions described below with respect to the embodiments of the present disclosure may be used with respect to anodes configured with Si as an alloying-type anode material to achieve higher stability, higher energy density, higher rate performance, and/or improvements to other performance characteristics.

Embodiments of the present disclosure are directed to reducing one or more of the above-discussed challenges of various types of nanocomposite electrode materials (for example, conversion-type and alloying-type materials). For example, various embodiments of the present disclosure may be implemented with respect to nanocomposite electrode materials that experience certain volume changes during cycling (for example, moderately high volume changes (e.g., 8-180 vol. %) during the first charge-discharge cycle and moderate volume changes (e.g., 4-50 vol. %) during the subsequent charge-discharge cycles), an average particle size in the range of around 0.2 to around 20 microns and a specific surface area in the range of around 0.3 to around 60 $m^2/g$ for a broad range of batteries. Further, various embodiments of the present disclosure are further directed to formulating more stable electrodes in moderate (e.g., 2-4 $mAh/cm^2$) and relatively high capacity loadings (e.g., 4-10 $mAh/cm^2$), relatively high packing density (e.g., electrode porosity filled with electrolyte in the range of around 5 to about 35 vol. % after the first charge-discharge cycle) and relatively low binder content (e.g., 1-14 wt. %).

As noted above, conventional anode materials utilized in Li-ion batteries are of an intercalation-type. Conventional cathode materials utilized in Li-ion batteries are also of an intercalation-type. Such cathodes may exhibit a highest charging potential of less than around 4.3 V vs. Li/Li+, gravimetric capacity less than 190 mAh/g (based on the mass of active material) and volumetric capacity of less than 1000 $mAh/cm^3$ (based on the volume of the electrode and not counting the volume occupied by the current collector foil). For conventional anodes, higher energy density in Li-ion batteries may be achieved either by using higher-voltage cathodes (e.g., cathodes with a highest charging potential from around 4.3 V vs. Li/Li+ to around 5.1 V vs. Li/Li+) or by using so-called conversion-type cathode materials. Combination of such types of higher energy density cathodes with high-capacity (e.g., Si based) anodes may result in high cell-level energy density. However, the cycle stability and other performance characteristics of such cells may not be suitable for certain applications, at least when used in combination with conventional electrolytes.

One or more embodiments of the present disclosure are directed to electrolyte compositions for use with a combination of relatively high voltage intercalation cathodes (e.g., cathodes with the highest charging potential in the range of around 4.3 V to about 4.5 V vs. Li/Li+ and, in some cases, from about 4.5 V vs. Li/Li+ to about 5.1 V vs. Li/Li+) with a sub-class of high-capacity moderate volume changing anodes (e.g., anodes comprising (nano)composite anode powders, which exhibit moderately high volume changes (e.g., 8-180 vol. %) during the first charge-discharge cycle, moderate volume changes (e.g., 4-50 vol. %) during the subsequent charge-discharge cycles, an average size (e.g., average diameter) in the range of around 0.2 to around 40 microns and specific surface area in the range of around 0.3 to around 60 $m^2/g$ normalized by the mass of the active electrode particles and, in the case of Si-comprising anodes, specific capacities in the range of around 550 to around 2400 mAh/g (e.g., when normalized by the total mass of the active electrode particles, conductive additives and binders) or in the range of around 600 to around 2600 mAh/g (e.g., when normalized by the mass of the active anode particles only)).

In a further example, the particular electrolyte composition may depend on the value of the highest cathode charge potential.

Examples of high specific and high volumetric capacity conversion-type cathode materials include, but are not limited to, fluorides, chlorides, sulfides, selenides, and others. For example, fluoride-based cathodes may offer higher potential due to their higher capacities, in some cases exceeding 300 mAh/g (e.g., greater than 1200 mAh/$cm^3$ at the electrode level). For example, in a Li-free state, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g. Mixtures (for example, in the form of alloys) of fluorides may offer a theoretical capacity approximately calculated according to the rule of mixtures. The use of mixed metal fluorides may sometimes be advantageous (e.g., may offer higher rates, lower resistance, higher practical capacity, or longer stability). In a fully lithiated state, metal fluorides convert to a composite comprising a mixture of metal and LiF clusters (or nanoparticles). Examples of reversible reactions of conversion-type metal fluoride cathodes may include $2Li+CuF_2 \leftrightarrow 2LiF+Cu$ for $CuF_2$-based cathodes or $3Li+FeF_3 \leftrightarrow 3LiF+Fe$ for $FeF_3$-based cathodes). It will be appreciated that metal fluoride-based cathodes may be prepared in Li-free, partially lithiated or fully lithiated states. Another example of a possible conversion-type cathode (or, in some cases, anode) material is sulfur (S) (e.g., in a Li-free state) or lithium sulfide (e.g., $Li_2S$, in a fully lithiated state). In order to reduce dissolution of active material during cycling, to improve electrical conductivity, or to improve mechanical stability of S/$Li_2S$ electrodes, one may utilize formation of porous S, $Li_2S$, porous S—C composites, $Li_2S$—C composites, porous S-polymer composites, or other composites comprising S or $Li_2S$, or both.

Certain conventional conversion-type electrodes used in Li-ion batteries may suffer from performance limitations. Formation of electrodes from (nano)composites may, at least partially, overcome such performance limitations. For example, (nano)composites may offer reduced voltage hysteresis, improved capacity utilization, improved rate performance, improved mechanical and/or electrochemical stability, reduced volume changes, and other positive attributes. Examples of such (nano)composite cathode materials include, but are not limited to, LiF—Cu—Fe—C nanocomposites, LiF—Cu—Fe—C-metal oxide nanocomposites, $FeF_2$—C nanocomposites, $FeF_3$—C nanocomposites, $FeF_3$—$CuF_2$—C nanocomposites, $FeF_3$—$CuF_2$—C-metal oxide nanocomposites, $CuF_2$—C nanocomposites, LiF—Cu—C nanocomposites, LiF—Cu—C-metal oxide nanocomposites, LiF—Cu—C-polymer nanocomposites, LiF—Cu—C-polymer-metal oxide nanocomposites, LiF—Cu-metal-polymer nanocomposites, and many other porous nanocomposites comprising LiF, $FeF_3$, $FeF_2$, $MnF_3$, $CuF_2$, $NiF_2$, $PbF_2$, $BiF_3$, $BiF_5$, $CoF_2$, $SnF_2$, $SnF_4$, $SbF_3$, $SbF_5$, $CdF_2$, or $ZnF_2$, or other metal fluorides or their mixtures as well as various metal oxides (e.g., as a protective layer, preferably not undergoing conversion reaction with Li in the cathode operational potential range). In some examples, metal fluoride nanoparticles may be infiltrated into the pores of porous carbon (for example, into the pores of activated carbon particles) to form these metal-fluoride-C nanocomposites. In particular, in at least one embodiment, high-capacity (nano)composite cathode powders, which exhibit moderately high (for a cathode) volume changes (e.g., 5-100 vol. %) during the first charge-discharge cycle, moderate volume changes (e.g., 4-50 vol. %) during the subsequent charge-discharge cycles, and an average size (for example, a diameter, in the case of spherical particles) in the range of around 0.2 to around 20 microns may be used for battery applications to improve manufacturability and performance characteristics. Furthermore, in one or more embodiments, a near-spherical (e.g., spheroidal) shape of the (nano)composite particles may increase rate performance and volumetric capacity of the electrodes. While some improvements to cell performance characteristics may be achieved with the formation and utilization of such conversion-type nanocomposite cathode materials and electrode shaping, additional improvements in cell performance characteristics may be achieved via the composition and preparation of electrolytes.

In one or more embodiments, electrolyte compositions that provide cell performance enhancements to particular electrode materials may be used. For example, in one or more exemplary electrolyte compositions may work well for a combination of (i) high capacity conversion-type (nano)composite cathode materials (e.g., conversion-type nano)composite cathode materials which exhibit moderate volume changes (e.g., 5-50 vol. %) during the first charge-discharge cycle and small-to-moderate volume changes (e.g., 3-40 vol. %) during the subsequent charge-discharge cycles, and an average size (for example, a diameter, in the case of spherical particles) in the range of around 0.2 to around 20 microns) with (ii) a sub-class of high-capacity moderate volume changing anodes (e.g., anodes comprising (nano)composite anode powders, which exhibit moderately high volume changes (e.g., 8-180 vol. %) during the first charge-discharge cycle, moderate volume changes (e.g., 4-50 vol. %) during the subsequent charge-discharge cycles, an average size (e.g., average diameter) in the range of around 0.2 to around 40 microns and specific surface area in the range of around 0.3 to around 60 $m^2$/g normalized by the mass of the active electrode particles and, in the case of Si-comprising anodes, specific capacities in the range of around 550 to around 2400 mAh/g (e.g., when normalized by the total mass of the active electrode particles, conductive additives and binders) or in the range of around 650 to around 2600 mAh/g (e.g., when normalized by the mass of the active anode particles only)).

In one or more embodiments of the present disclosure, electrodes based on high capacity nanocomposite powders (e.g., comprising conversion- or alloying-type active materials) that experience certain volume changes during cycling (e.g., relatively high volume changes (e.g., an increase by 8-180 vol. % or a reduction by 8-70 vol. %) during the first charge-discharge cycle and moderate volume changes (e.g., 4-50 vol. %) during the subsequent charge-discharge cycles) and an average size in the range of around 0.2 to around 20 microns (such as Si-based nanocomposite anode powders, among many others) may benefit from improvements to various cell performance characteristics when specific compositions of electrolytes are used (e.g., particularly for high capacity loadings).

For example, (i) continuous volume changes in high capacity nanocomposite particles during cycling in combination with (ii) electrolyte decomposition on the electrically conductive electrode surface at electrode operating potentials (e.g., due in part to electrochemical electrolyte reduction in the case of Si-based anodes) may lead to a continuous (even if relatively slow) growth of a solid electrolyte interphase (SEI) layer on the surface of the nanocomposite particles, which is undesirable, particularly if such growth is fast (e.g., greater than 0.1% per cycle). Different electrolyte compositions may be associated with different SEI growth rates.

In a further example, swelling of binders in electrolytes depends not just on the binder composition, but also on the electrolyte compositions. Furthermore, such swelling (and the resulting performance reduction) may correlate with a reduction in elastic modulus upon exposure of binders to electrolytes. In this case, the smaller the reduction in modulus in certain electrolytes, the more stable the binder-linked (nano)composite active particles/conductive additives interface becomes. In an example, a reduction in binder modulus by over 15-20% may result in a noticeable reduction in performance. In a further example, a reduction in the binder modulus by two times (2×) may typically result in a higher performance reduction. In a further example, a reduction in modulus by five or more times (e.g., 5×-500×) may result in an even higher performance reduction. Therefore, in certain embodiments, selecting an electrolyte composition that does not induce significant binder swelling may function to increase cell performance characteristics. In some examples, an electrolyte composition may be selected to ensure that a reduction in the binder modulus does not exceed 30% (e.g., or more preferably, by no more than 10%) when exposed to electrolyte. In anodes which comprise more than one binder composition, an electrolyte composition may be selected to ensure that a reduction in the binder modulus in at least one of the binders does not exceed 30% (e.g., more preferably, by no more than 10%) when exposed to electrolyte.

In one or more embodiments of the present disclosure, electrolyte compositions may be used to achieve one or more of the above-noted benefits (e.g., a more controlled reduction to the binder modulus upon exposure of the electrolyte to at least one binder, etc.) in Li and Li-ion cells with high capacity nanocomposite electrode powders (comprising conversion-type or alloying-type active materials) that experience certain volume changes during cycling (e.g., moderately high volume changes (e.g., an increase by 8-180 vol. % or a reduction by 8-70 vol. %) during the first charge-discharge cycle and moderate volume changes (e.g., 4-50 vol. %) during the subsequent charge-discharge cycles), an average size in the range of around 0.2 to around 20 microns and specific surface area in the range of around 0.3 $m^2/g$ to about 60 $m^2/g$. For example, one electrolyte composition of an electrolyte in accordance with an embodiment of the present disclosure may comprise a combination of three or more of the following components: (a) low-melting point (LMP) solvent or solvent mixture; (b) regular-melting point (RMP) solvent or solvent mixture; (c) additive (ADD) solvent or solvent mixture; (d) main (MN) Li metal-ion salt or Li metal-ion salt mixture; (e) additive (ADD) salt or salt mixture (not necessarily Li-based; may include other metal-ion species instead of or in addition to Li metal-ion species); (f) other functional additives (OFADD), where the LMP solvent or LMP solvent mixture may preferably contribute to 10-95 vol. % of the volume of all solvents in the electrolyte; where RMP solvent or RMP solvent mixture may preferably contribute to 5-90 vol. % of the volume of all solvents in the electrolyte; and where ADD solvent or solvent mixture may preferably contribute to 0-5 vol. % of the volume of all solvents in the electrolyte. In an example, particular values and/or particular ranges of values of the volume fractions of the LMP, RMP and ADD solvents or solvent mixtures in an exemplary electrolyte composition may depend on various factors such as the cell operating potentials, cell operating (or cell storage) temperature and rates of charge and discharge desirable for cells in a given application. As used herein, solvent 'mixtures' may alternatively be referred to as 'co-solvents'.

In some particular cell designs and applications, the use of electrolyte mixtures with no LMP solvent or LMP solvent mixture may provide acceptable performance. However, in other applications, the use of an LMP solvent or LMP solvent mixture in the range of around 10% by volume (normalized by all the solvents in the electrolyte) to around 95% by volume (in some cases, from around 20 to around 80 vol. %; in some other cases, from around 30 to around 70 vol. %, and in some cases, from around 40 to around 60 vol. %) may be highly advantageous for certain applications, particularly for use with high areal capacity loading electrodes. In some designs, it may be further advantageous for the LMP solvent(s) (or at least one of the components of the LMP solvent mixture) to comprise a double bond in their structure (e.g., due to the cross-linking of such molecules on the electrode surface during electrochemical cycling). Accordingly, LMP solvent(s) and/or an LMP solvent mixture may provide cell performance enhancements when used in an electrolyte for certain applications at room temperature and/or high temperature cycling.

In one or more embodiments of the present disclosure, in an example, the concentration of MN Li salt or MN Li salt mixture in the electrolyte may preferably be in the range of around 1M to around 2.4M. In a further example, the concentration of ADD salt or ADD salt mixture in the electrolyte composition may preferably be in the range of around 0 M to around 1M. More preferably, the total salt composition may range from around 1.2M to around 2.5M. In a further example, concentration of OFADD in the electrolyte composition may preferably be in the range of around 0 M to around 1M or from around 0 vol. % to around 15 vol. % (as a volume fraction of the whole electrolyte).

As used herein, LMP refers to a melting point (of a solvent or a solvent mixture) that is generally below a threshold (e.g., below minus (−) 70° C.), and typically in the range, for example, from around minus (−) 120° C. to around minus (−) 60° C. As used herein, RMP refers to a melting point (of a solvent or a solvent mixture) that is generally above a threshold (e.g., above minus (−) 60° C.), and typically in the range from, for example, around minus (−) 60° C. to around plus (+) 30° C. In a further example, LMP may refer to a melting point (of a solvent or a solvent mixture) in a narrower range, such as from around minus (−) 110° C. to around minus (−) 70° C. or from around minus (−) 100° C. to around minus (−) 80° C.

In one or more embodiments of the present disclosure, it may further be advantageous for the LMP solvent(s) (or at least one major component of the LMP solvent mixture) in the electrolyte to exhibit a boiling point in excess of about +50° C. (more preferably, in excess of about +70° C.; and still more preferably, in excess of about +80° C.).

Examples of solvents suitable for use as LMP solvents in the electrolyte (or for the fabrication of an LMP solvent mixture in the electrolyte) in the context of this disclosure may comprise: various phosphorus based (phosphorus containing or phosphorous) solvents, various silicon based solvents, various esters, and various ethers.

In an embodiment of the present disclosure, LMP solvent (s) and/or LMP solvent mixture components in the electrolyte may also be (either fully or partially) fluorinated. In an example, fluorination may enhance cell rate performance, may improve oxidation stability on the high-voltage cathodes, and may reduce flammability of electrolyte. In certain applications, modifying electrolyte solvent with a fluorine atom may lower the energy of the highest occupied molecular orbital (HOMO), thus resulting in greater oxidative stability. Modifying the electrolyte solvent with a fluorine atom may also lower the energy of the lowest unoccupied molecular orbital (LUMO), making the electrolyte more prone to a reduction on an anode. This may lead to a greater stability at the cathode and/or the anode (e.g., as a result of a denser SEI formed at an earlier onset potential, which may reduce or prevent solvent co-intercalation into the SEI and reduce SEI growth during cycling of the volume-changing anode).

In an embodiment of the present disclosure, the use of lactones as LMP solvent(s) (or as a component in an LMP co-solvent) in the electrolyte may provide advantages for certain electrolytes comprising certain salts (e.g., where lactones provide higher solubility than esters or carbonates, for example, in the case of LiBoB salt and others). In a further example, lactones may also improve interfacial kinetics when used as an LMP solvent (or as a component in an LMP co-solvent) in Li-ion batteries.

In another embodiment of the present disclosure, the use of phosphorous based solvents as LMP solvent(s) (or as a component in an LMP co-solvent) in the electrolyte may be advantageous for particular applications where reduction of electrolyte flammability is a desired characteristic and/or where cells comprise high-voltage cathodes (e.g., due to their better oxidation stability).

In another embodiment of the present disclosure, the use of silicon-based solvents as LMP solvent(s) (or as a component in an LMP co-solvent) in the electrolyte may be advantageous for particular applications due to their low viscosities and broad temperature ranges (e.g., low melting points and high boiling points). In addition, the use of silicon based solvents may be advantageous for cells where reduced electrolyte flammability is a desired characteristic and/or in cells comprising high voltage cathodes.

In another embodiment of the present disclosure, the use of esters as LMP solvent(s) (or as a component in an LMP co-solvent) in the electrolyte may be advantageous for certain applications due to a combination of their low viscosity and broad range of operable temperatures. In an example, certain esters may also exhibit good high voltage stability and may be used in combination with the high voltage cathodes. In a further example, the use of esters as LMP solvent(s) (or as a component in an LMP co-solvent) may produce favorable SEI on the surface of high capacity moderate volume changing (nano)composite anodes (and, in some cases, on the surface of high capacity volume changing conversion-based (nano)composite cathodes).

In a further embodiment of the disclosure, examples of suitable esters for use as LMP solvent(s) or as component(s) in LMP co-solvent(s) in the electrolyte include, but are not limited to, various formates (e.g., methyl formate, ethyl formate, propyl formate, butyl formate, amyl formate, hexyl formate, heptyl formate, etc.), various acetates (e.g., methyl acetate, ethyl acetate, propyl acetate, butyl acetate, amyl acetate, hexyl acetate, heptyl acetate, etc.), various propionates (e.g., methyl propionate, ethyl propionate, propyl propionate, butyl propionate, amyl propionate, hexyl propionate, heptyl propionate, etc.), various butyrates (e.g., methyl butyrate, ethyl butyrate, propyl butyrate, butyl butyrate, amyl butyrate, hexyl butyrate, heptyl butyrate, etc.), various valerates (e.g., methyl valerate, ethyl valerate, propyl valerate, butyl valerate, amyl valerate, hexyl valerate, heptyl valerate, etc.), various caproates (e.g., methyl caproate, ethyl caproate, propyl caproate, butyl caproate, amyl caproate, hexyl caproate, heptyl caproate, etc.), various heptanoates (e.g., methyl heptanoate, ethyl heptanoate, propyl heptanoate, butyl heptanoate, amyl heptanoate, hexyl heptanoate, heptyl heptanoate, etc.), various caprylates (e.g., methyl caprylate, ethyl caprylate, propyl caprylate, butyl caprylate, amyl caprylate, hexyl caprylate, heptyl caprylate, etc.), various nonaoates (e.g., methyl nonaoate, ethyl nonaoate, propyl nonaoate, butyl nonaoate, amyl nonaoate, hexyl nonaoate, heptyl nonaoate, etc.), various decanoates (e.g., e.g., methyl decanoate, ethyl decanoate, propyl decanoate, butyl decanoate, amyl decanoate, hexyl decanoate, heptyl decanoate, etc.), and fluorinated versions of the above-discussed esters, to name a few examples.

In some designs, it may be preferable for the ester(s) used as the LMP solvent and/or in the LMP co-solvent in the electrolyte not to comprise side groups and not be branched.

In some designs, it may be preferable for the majority (i.e., 50-100 vol. %) of all the ester(s) used as the LMP solvent and/or in the LMP co-solvent in the electrolyte to have five (5) carbon atoms in the backbone (e.g., as in $C_5H_{10}O_2$).

In some designs, it may be preferable for the ester(s) to contribute from around 20 to around 80 vol. % of all the solvent in the electrolyte; in some other cases, from around 30 to around 70 vol. %, and in some cases, from around 40 to around 60 vol. %.

In some designs, it may be preferable for an LMP co-solvent composition in the electrolyte to comprise two or more esters. In some designs, it may be further preferable for these esters to exhibit either the same chemical tail (e.g., the same R group) and/or to belong to the same sub-class. In some designs, it may be preferable for both the LMP and RMP solvent (or solvent mixtures) in the electrolyte to comprise esters. In some designs, it may be further preferable for these esters to exhibit either the same chemical tail (e.g., the same R group) or to belong to the same sub-class.

In some designs, it may be preferable for the LMP solvent(s) (or LMP solvent mixture) in the electrolyte to exhibit a flash point in excess of approximately 10° C. In some designs, it may be preferable for the LMP solvent(s) (or solvent mix) in the electrolyte to exhibit a boiling point in excess of approximately 70° C. (in some designs, in excess of approximately 100° C.).

In some designs, it may be preferable for electrolyte to comprise a combination of 30-70 vol. % (e.g., around 50 vol. %) of ester(s) (in some case, with the majority or all esters exhibiting a formula $C_5H_{10}O_2$) with 15-30 vol. % (e.g., around 20 vol. %) of linear carbonates (e.g., a mixture of EMC and DMC). The vol. % is given as a percentage of all the solvents in the electrolyte.

In some designs, it may be preferable for electrolyte to comprise a combination of 30-70 vol. % (e.g., around 50 vol. %) of ester(s) (in some case, with the majority or all esters exhibiting a formula $C_5H_{10}O_2$) with 15-30 vol. % (e.g., around 20 vol. %) of cyclic carbonates (e.g., PC). The vol. % is given as a percentage of all the solvents in the electrolyte.

In some designs, it may be preferable for electrolyte to comprise a combination of 30-70 vol. % (e.g., around 50 vol.

%) of ester(s) (in some case, with the majority or all esters exhibiting a formula $C_5H_{10}O_2$) with both 15-30 vol. % (e.g., around 20 vol. %) of cyclic carbonates (e.g., PC) and 15-30 vol. % (e.g., around 20 vol. %) of linear carbonates (e.g., a mixture of EMC and DMC). The vol. % is given as a percentage of all the solvents in the electrolyte.

More broadly, examples of solvents suitable for use as RMP solvents in the electrolyte (or for the fabrication of a RMP solvent mixture in the electrolyte) in one or more embodiments of the present disclosure may comprise: various carbonates (e.g., fluorinated acyclic carbonates and propylene carbonate may be advantageous for use in cells with high voltage cathodes), various sulfur-comprising solvents such as various sulfones (e.g., dimethyl sulfone, ethylmethyl sulfone, etc.) or various sulfoxides, various lactones, various phosphorous-based solvents (e.g., dimethyl methylphosphonate, triphenyl phosphate, etc.), various silicon-based solvents, various types of higher melting point esters (e.g., esters with melting points above around minus (–) 50° C.), various ethers (e.g., dioxolane, monoglyme, diglyme, triglyme, tetraglyme, and polyethylene oxide, etc.), various cyclic ester-based molecules (e.g., butyrolactones and valerolactones), various dinitriles (e.g., succinonitrile, adiponitrile, and glutaronitrile), and various ionic liquids (e.g., imidazoliums, pyrrolidiniums, piperidiniums, etc., may be advantageous in cells comprising high voltage cathodes).

In an example, the RMP solvent(s) or RMP solvent mixture may also be (either fully or partially) fluorinated. In an example, one particular fluorinated solvent that may be used in a Li-ion battery is fluoroethelene carbonate (FEC). FEC may be used to form a more stable (or more cross-linked) SEI relative to other solvents such as ethylene carbonate, EC. However, in certain applications, excessive use of FEC in the electrolyte (e.g., above around 30 vol. %) may also decrease cell performance.

In some designs (e.g., in cells with Si-comprising anodes), it may be preferable for electrolyte to comprise a combination of 30-70 vol. % (e.g., around 50 vol. %) of ester(s) (in some case, with the majority of all esters exhibiting a formula $C_5H_{10}O_2$) with 15-30 vol. % (e.g., around 20 vol. %) of cyclic carbonates (e.g., PC), 15-30 vol. % (e.g., around 20 vol. %) of linear carbonates (e.g., a mixture of EMC and DMC) and 5-20 vol. % (e.g., around 5 or around 7 vol. %) of a fluorinated solvent (e.g., FEC). The vol. % is given as a percentage of all the solvents in the electrolyte. In some designs, such an electrolyte may preferably comprise a combination of two or more (in some designs, three or more) salts with the total concentration preferably in excess of 1.2M and below 2.0M. In one illustrative example, such a combination may be 1M $LiPF_6$, 0.2M LiFSI, and 0.1M LiBOB. In another illustrative example, such a combination may be 1.1M $LiPF_6$, 0.1M LiFSI, and 0.1M LiBOB. In yet another illustrative example, such a combination may be 1.2M $LiPF_6$, 0.2M LiFSI, and 0.1M LiBOB.

In another embodiment of the present disclosure, the use of carbonates as RMP solvent(s) (or as a component in an RMP co-solvent) in the electrolyte may be advantageous for certain applications due to their high dielectric constant (and thus high solubility for many Li salts) (particularly, the cyclic carbonates, such as EC, propylene carbonate PC, vinylene carbonate VC, FEC, and others). In an example, the use of acyclic carbonates with lower freezing points than EC and FEC (e.g., propylene carbonate, dimethyl carbonate, diethyl carbonate, and ethylmethyl carbonate) as RMP solvent(s) (or as a component in an RMP co-solvent) in the electrolyte may also be advantageous for certain applications (e.g., low-temperature applications that operate below 0° C.). In certain applications, carbonates may play a role in the formation of a favorable SEI on volume-changing anodes (and, in some cases, cathodes). In an example, the use of sulfones and sulfoxides as RMP solvent(s) (or as a component in an RMP co-solvent) in the electrolyte may be advantageous for certain applications due to their high oxidation stability and improved performance in cells comprising high voltage cathodes, or in cells where reduced electrolyte flammability is a desired characteristic.

Examples of suitable esters for use in an RMP solvent in the electrolyte or as a component in an RMP co-solvent in the electrolyte include esters with melting points above around minus (–) 50° C., including but not limited to some of the caproates, some of the heptanoates (e.g., amyl heptanoate, heptyl heptanoate, etc.), most of the caprylates (e.g., methyl caprylate, ethyl caprylate, propyl caprylate, butyl caprylate, amyl caprylate, hexyl caprylate, heptyl caprylate, etc.), most of the nonaoates (e.g., methyl nonaoate, ethyl nonaoate, propyl nonaoate, butyl nonaoate, amyl nonaoate, hexyl nonaoate, heptyl nonaoate, etc.), and most of the decanoates (e.g., methyl decanoate, ethyl decanoate, propyl decanoate, butyl decanoate, amyl decanoate, hexyl decanoate, heptyl decanoate, etc.), to name a few examples. In some designs, it may be preferable for the linear (aliphatic) ester(s) of the RMP solvent or RMP co-solvent composition in the electrolyte not to comprise side groups. In some designs, it may be preferable for the ester(s) in an RMP solvent in the electrolyte or as a component in an RMP co-solvent in the electrolyte to be partially or fully fluorinated. In some designs, it may be preferable for the ester(s) exhibiting a melting point above around minus (–) 50° C. not to exceed 20 vol. % (in some designs, not to exceed 10 vol. %; in some designs, not to exceed 5 vol. %; in some designs not to exceed 3 vol. %) as the fraction of all the solvents in the electrolyte.

Examples of solvents suitable for use as ADD solvents in the electrolyte (or for the fabrication of an ADD solvent mixture in the electrolyte) in one or more embodiments of the present disclosure may comprise: various carbonates (including fluorinated carbonates), various sulfones (including fluorinated ones), various sulfoxides (including fluorinated ones), various lactones (including fluorinated ones), various phosphorous-based solvents (including fluorinated ones), various silicon-based solvents (including fluorinated ones) and various ethers (including fluorinated ones), various nitriles and dinitriles, among others. In certain applications, nitriles and dinitriles may suffer from unfavorable SEI on the anode, but in small quantities (e.g., below 10%, or preferably below 5 vol. %) their application in the electrolyte mix may improve electrolyte conductivity and cell performance, particularly where high voltage cathodes are utilized. Further, in certain applications (e.g., when high (e.g., above 20 vol. %) content of so-called "SEI formers" are utilized in the electrolyte), nitriles and dinitriles may also be components of an LMP solvent mixture.

In some designs (e.g., in cells with Si-comprising anodes), it may be preferable for electrolyte to comprise a combination of 30-70 vol. % (e.g., around 50 vol. %) of ester(s) (in some case, with the majority or all esters exhibiting a formula $C_5H_{10}O_2$) with 15-30 vol. % (e.g., around 20 vol. %) of cyclic carbonates (e.g., PC), 15-30 vol. % (e.g., around 20 vol. %) of linear carbonates (e.g., a mixture of EMC and DMC), 5-20 vol. % (e.g., around 7 vol. %) of a fluorinated solvent (e.g., FEC) and 0.5-3 vol. % (e.g., around 1.5 vol. %) of phosphorous comprising ADD solvent.

Examples of the components of the MN Li salts or MN Li salt mixture suitable for use in the electrolyte in one or more embodiments of the present disclosure may include: various lithium phosphates (e.g., lithium hexafluorophosphate, $LiPF_6$) or various lithium organophosphates, various lithium borates and various lithium organoborates (e.g., lithium fluoroborate, $LiBF_4$, lithium bis(oxalato)borate, $LiB(C_2O_4)_2$ (LIBOB), lithium difluoro(oxalate)borate, $LiBF_2(C_2O_4)$, among others), various lithium imides (e.g., lithium bis (fluorosulfonyl)imide, LiFSI), lithium hexafluoroantimonate ($LiSbF_6$) and various lithium organohexafluoroantimonates, lithium hexafluorosilicate ($Li_2SiF_6$) and various organohexafluorosilicates, lithium hexafluoroaluminate ($Li_3AlF_6$) and various lithium organofluoroaluminates, various lithium aluminates and various lithium organoaluminates (e.g., lithium tetrachloroaluminate, $LiAlCl_4$, among others), lithium perchlorate ($LiClO_4$), lithium nitrate ($LiNO_3$) and lithium organonitrates, lithium sulfate ($Li_2SO_4$) and various lithium organosulfates ($LiRSO_4$), lithium selenite ($Li_2SeO_4$) and various lithium organoselenates ($LiRSeO_4$), and others. In an example, using phosphates as an MN Li salt or as a component in an MN Li salt mixture in the electrolyte may provide a combination of high conductivity in the electrolyte and a broad voltage range. In another example, using borates as an MN Li salt or as a component in an MN Li salt mixture in the electrolyte may improve electrolyte (and cell) temperature stability and improve cycle stability of cells comprising either conversion-type cathodes (e.g., fluorides or sulfides or chlorides) or high voltage cathodes. However, a high concentration of borates (e.g., greater than 1M) may be difficult to achieve or may even be undesirable in certain applications (e.g., in applications requiring a high charging rate, due to low conductivity of electrolytes based solely on lithium borate salts), and thus in certain embodiments borates may be used specifically as a component in an MN Li salt mixture along with one or more other Li salts. In a further example, using imide salts as an MN Li salt or as a component in an MN Li salt mixture in the electrolyte may offer higher thermal stability and conductivity and may not be prone to hydrolysis (e.g., which is advantageous for certain applications where water contaminants are present in electrolytes in small quantities). In some applications, using lithium imides (e.g., LiFSI) as well as imides of other metals (e.g., magnesium bis(fluorosulfonyl)imide, lanthanum bis (fluorosulfonyl)imide, etc.) as an MN Li salt or as a component in an MN Li salt mixture in the electrolyte may improve SEI stability by inducing cross-linking (e.g., when ether or other suitable LMP solvents are present in the electrolyte). In another example, using lithium aluminates as an MN Li salt or as a component in an MN Li salt mixture in the electrolyte may offer improved thermal stability. In another example, lithium nitrate, lithium organonitrates and/or lithium organosulfates as an MN Li salt or as a component in an MN Li salt mixture in the electrolyte may improve SEI properties (e.g., stability, ionic conductivity, etc.) and/or cell stability during long-term cycling.

Examples of OFADD (or OFADD components) suitable for use in the electrolyte in one or more embodiments of the present disclosure may include: (i) various unsaturated organic compounds (e.g., which may provide sites for free radical polymerization of the surface layer under reductive or oxidative conditions; such reaction within the cell may improve robustness and properties of the SEI/protective surface layer on the electrodes) or other types of initiator (or catalyst) molecules; (ii) various sulfur- or selenium-based organic additives (e.g., which may improve SEI stability or rate performance and, in the case of selenium, may improve electrical connectivity within the anode; such additives may possess higher reduction potentials than their carbonate counterparts, and therefore may form SEI on the anode at a higher potential, which may be advantageous in applications that benefit from improved SEI stability; in some examples, the addition of such compounds may result in the formation of a lithium-oxy-sulfite-comprising SEI layer); (iii) various boron-based organic additives (e.g., which may similarly improve the SEI as boron-based organic additives may decompose at higher potentials than carbonate based electrolyte components); (iv) various isocyanate-based additives (e.g., which also may improve SEI properties, for example, upon decomposition into either polyamines or polyamides or other favorable compounds); (v) various ionic compounds (e.g., which may improve SEI stability or rate performance, such as by acting as sacrificial components that may favorably tune the interfacial chemistry); (vi) various inorganic and organic salts of rare earth elements (e.g., La, Ce, Dy, Eu, Tb, Pr, etc.), magnesium (Mg), calcium (Ca) or strontium (Sr) (e.g., which may improve SEI stability and properties and cell stability and properties). It will be appreciated that certain salts noted above as optional components in the OFADD, if used in the electrolyte, may alternatively be considered part of the ADD salt or ADD salt mixture. For example, the ADD salt or ADD salt mixture may comprise Li or Mg or Ca nitrates, organonitrates, sulfides, polysulfides, sulfates, organosulfates, selenides, polyselenides, selenites, and organoselenates, some or all of which may also be used in the OFADD.

In some designs, it may be preferable during the so-called cell "formation" to "cure" the SEI (e.g., to induce additional cross-linking within the SEI) on the (nano)composite volume changing anode after the first charge (e.g., when the anode is in the partially or fully expanded state). The "curing" process may be conducted at an elevated temperature (e.g., compared to the initial temperature of the charge-discharge cycle). In some designs, formation of free radicals (and/or the cross-linking within the SEI) may require heating the cell to a temperature in the range of around 30° C. to around 100° C. at least during some part of the "curing" process. In some designs, the "curing" process may range from around 1 minute to around one week. In some designs, the "curing" process may be conducted at both the partially or fully charged state and during at least part of the discharge. In some designs, the "curing" process may be conducted after the second charge (e.g., similarly, at the partially or fully charged state of the cell and/or during at least a portion of the discharge). In some designs, the "curing" process may be conducted after the third charge or later charge (e.g., similarly, at the partially or fully charged state of the cell and/or during at least a portion of the discharge).

FIGS. 2A-4 illustrate different impacts of varying the FEC content in example electrolyte compositions on cell performance in accordance with embodiments of the present disclosure, where the cell comprises high voltage lithium cobalt oxide (LCO) (cell being charged to around 4.4V) and a (nano)composite Si-comprising volume-changing anode with low specific surface area of the active (nano)composite particles (approximately 5 $m^2/g$). In the embodiments of FIGS. 2A-4, the MN Li salt used in the example electrolyte composition is $LiPF_6$ with a concentration of 1M. In the embodiments of FIGS. 2A-4, the RMP solvent mixture (total 52 vol. %) comprises carbonates, such as EMC, FEC (or EC or FEC:EC mix) and VC (2 vol. %). In the embodiments of FIGS. 2A-4, the LMP solvent comprises methyl butyrate (MB) (e.g., the methyl ester of butyric acid) at 48 vol. % of the total solvent content in the electrolyte. In conventional Si anodes, FEC may be used without any EC component (or FEC:EC mix) because higher FEC content provides greater stability. A higher FEC proportion in the FEC:EC mix used in the electrolyte composition of FIGS. 2A-4 may likewise provide greater stability. However, higher FEC content may be undesirable in certain applications, such as cells with high voltage cathodes due to significant gassing, particularly at higher temperatures, and related cathode degradation.

Figure 2A:
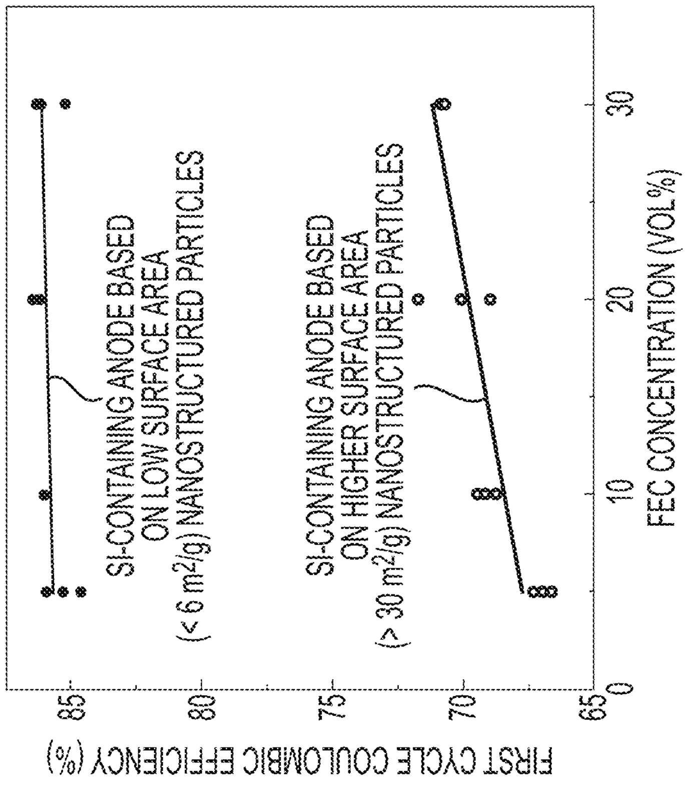
FIGS. 2A-2B illustrate selected performance characteristics for full cells compositing Si-based (nano)composite anodes exhibiting moderate (below 6 $m^2/g$) and elevated (greater than 30 $m^2/g$) specific surface area and electrolytes comprising different concentrations of fluoroethelene carbonate (FEC) in accordance with embodiments of the disclosure. The first cycle efficiency and cycling stability show a dependence on the concentration of FEC present in the electrolyte.
Figure 2B:
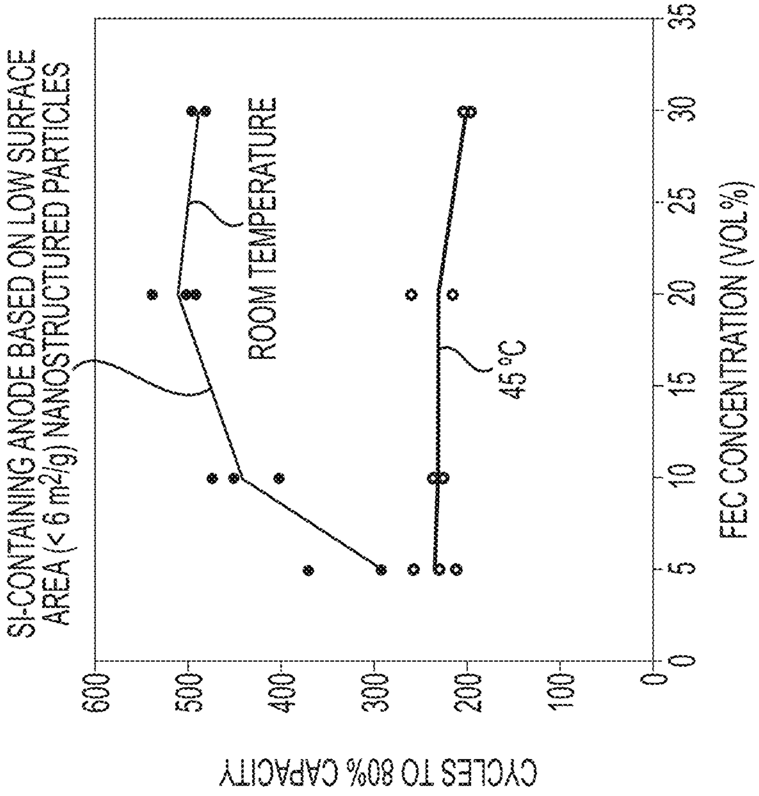

FIG. 2A shows that in contrast to certain conventional Si based anodes exhibiting relatively high specific surface area in excess of 30 $m^2/g$, certain low-surface area (less than 6 $m^2/g$) medium volume changing (nano)composite Si-containing anodes deployed with respect to electrolyte containing a lower content of FEC in accordance with an embodiment of the disclosure may provide adequate performance with high first cycle coulombic efficiency (FCE). The effect of varying the FEC % in the FEC:EC mix of the electrolyte in this example was studied in a series of electrolytes and examined in full cells cycled between 2.5V and 4.4V at C/2 rate. The FEC content was varied from 30% to 5% (percentage by volume relative to the electrolyte). As shown in FIG. 2A, little dependence between the concentration of FEC and formation characteristics was found. The concentration of FEC in the electrolyte does not significantly impact the first charge-discharge cycle efficiency, first charge-discharge cycle losses, and/or cycling starting capacity. Further, the performance of cells with MB-based LMP solvent used in the electrolyte was found to be adequate at both room temperature and at 45° C. in spite of the high charge voltage. FIG. 2B shows that lower FEC content may be advantageous for improved cycle stability at elevated temperatures (e.g., 45 C in this example), while room temperature cycle stability may slightly benefit from FEC content to be 5 vol. % or more (e.g., 10 vol. %).

Figure 3A:
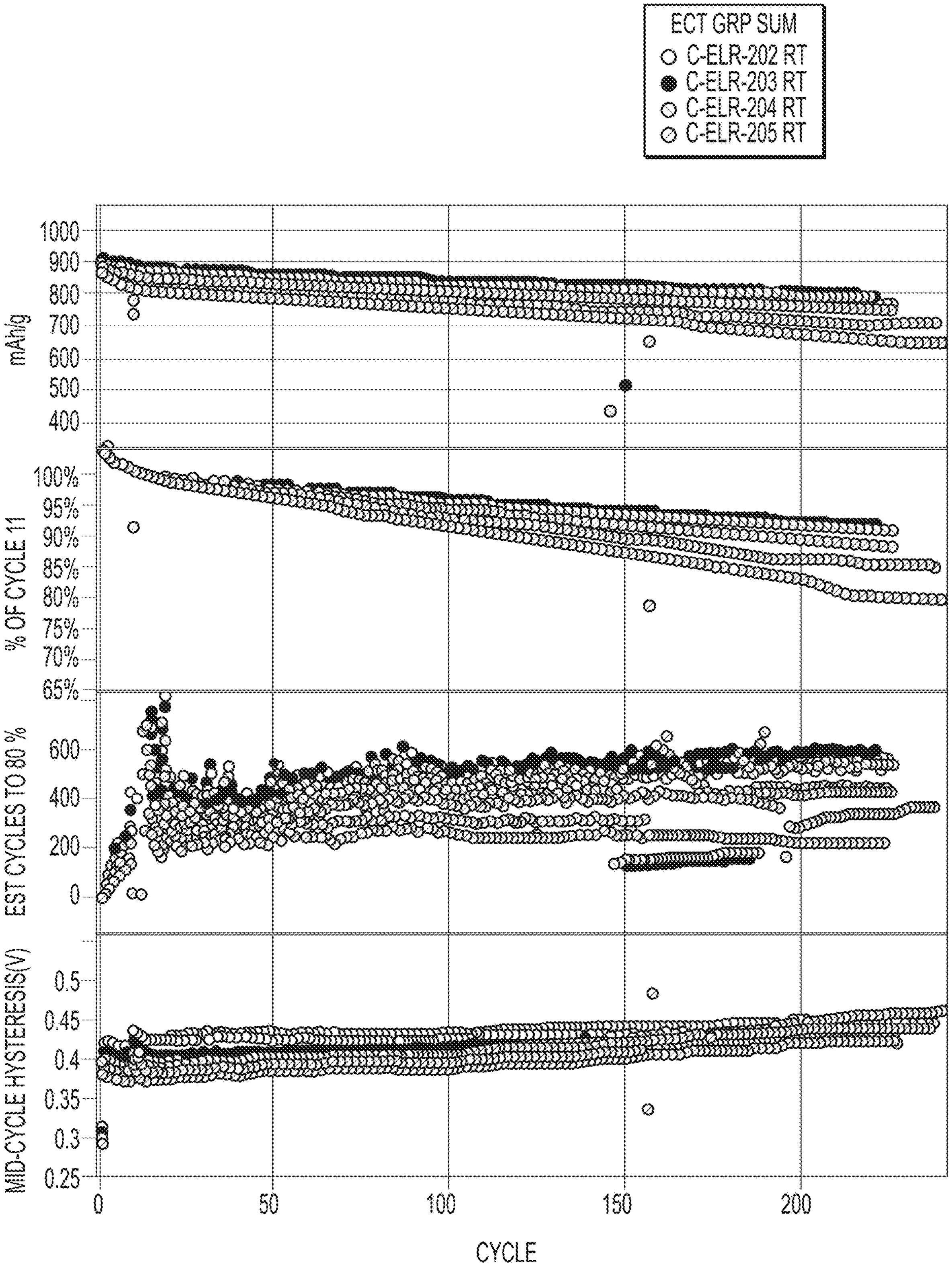
FIGS. 3A-3B show the impact of FEC content on cycle stability at room temperature for full cells compositing Si-based (nano)composite anodes exhibiting moderate (below 6 $m^2$/g) and elevated (greater than 30 $m^2$/g) specific surface area in accordance with an embodiment of the disclosure
Figure 3B:
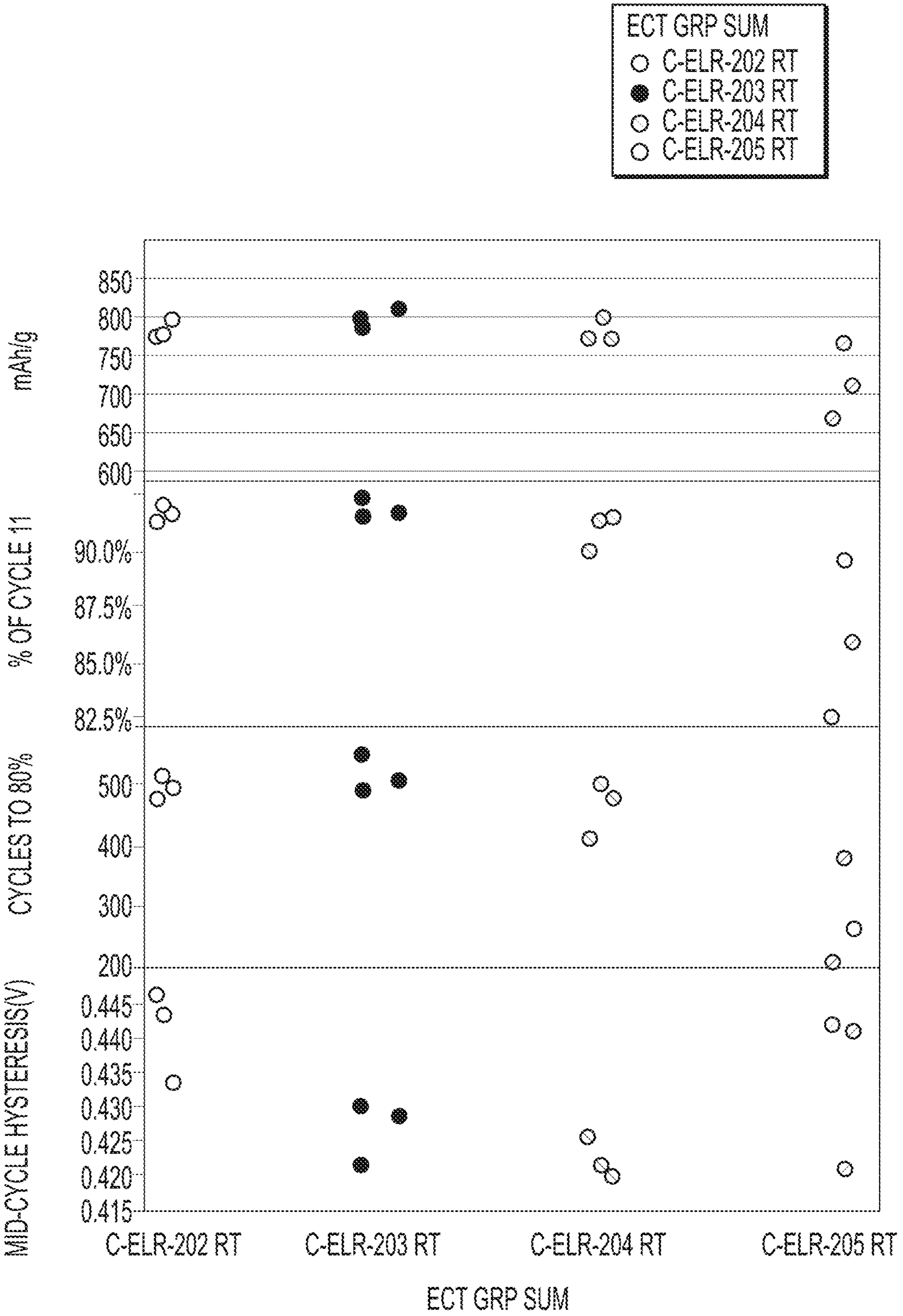

FIGS. 3A-3B show the impact of FEC content on cycle stability at room temperature in accordance with an embodiment of the disclosure. The cycle life characteristics at room temperature reveal these cells based on (nano)composite Si-comprising volume-changing anodes have a lower positive correlation to FEC % compared to cells with conventional Si-comprising anodes (which are more highly positively correlated to FEC %, and thereby more dependent on having a higher FEC % to perform adequately; the FEC % response of such conventional Si-comprising anodes is not shown in FIGS. 3A-3B). As shown in FIGS. 3A-3B, long term cycling data at room temperature for full cells of the (nano)composite Si-comprising volume-changing anodes with LCO cathodes with electrolytes ELR-202 (30% FEC), ELR-203 (20% FEC), ELR-204 (10% FEC), and ELR-205 (5% FEC) does not reveal a strong dependence between FEC % and performance characteristics. Regardless of FEC %, as shown in FIGS. 3A-3B, each cell performs similarly with regard to capacity retention, mid-cycle hysteresis, and estimated cycles to 80% of initial capacity. Certain conventional electrolytes for Si containing anode materials may contain between 20-50% FEC, whereas the electrolyte tested with respect to cells containing (nano)composite Si-comprising volume-changing anodes is able to perform well with as little as 5% FEC. It will be appreciated that the optimum FEC content for the electrolyte of a particular battery cell may depend on the particular composition of other RMT co-solvents, LMP co-solvent(s), salts and/or other components of the electrolyte as well as the cathode and anode compositions, cycling (or storage) voltage range, current density and temperature and other cell and cell cycling properties.

Figure 4A:
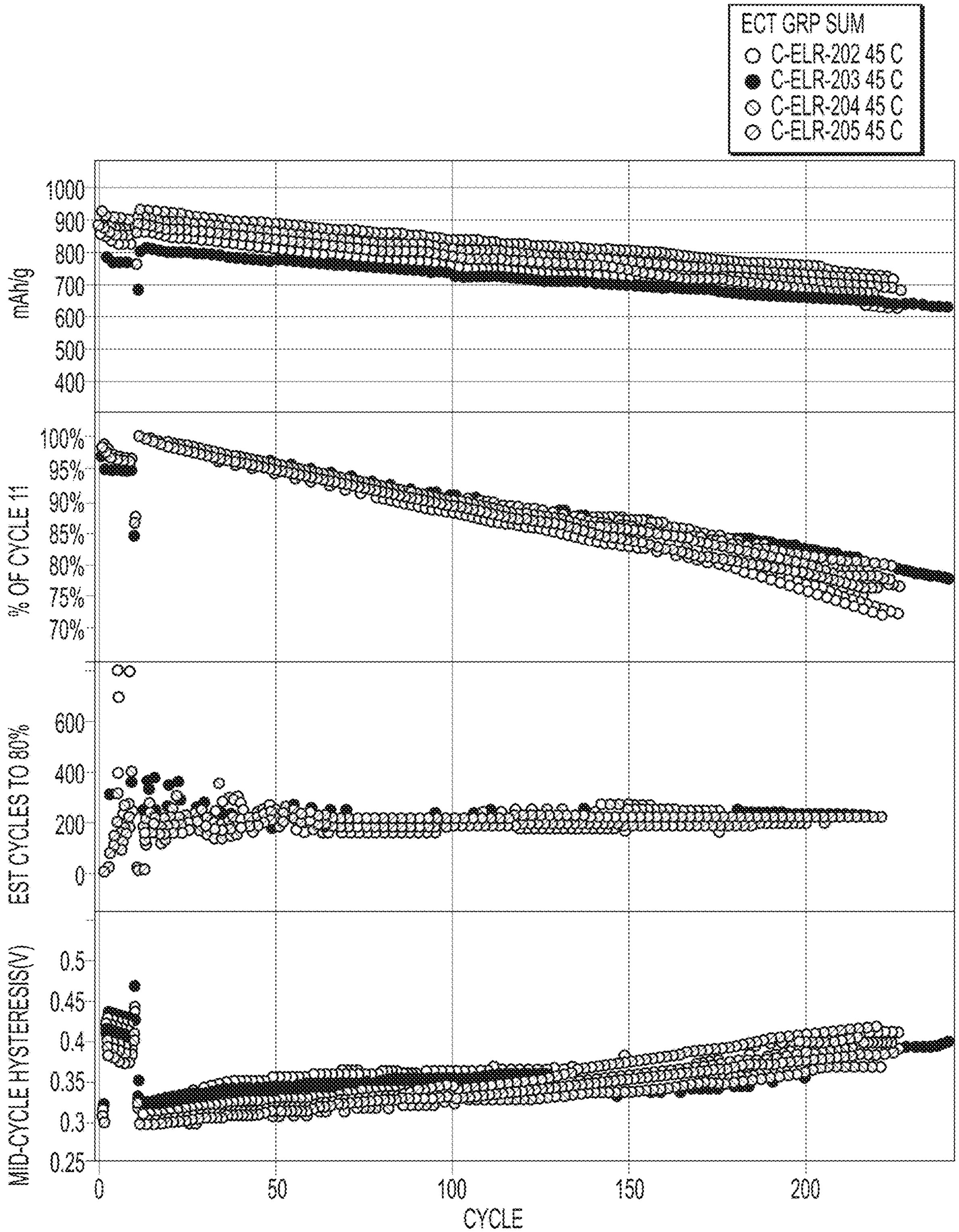
FIGS. 4A-4B shows the impact of FEC content on cycle stability at 45° C. for full cells compositing Si-based (nano) composite anodes exhibiting moderate (below 6 $m^2$/g) and elevated (greater than 30 m2/g) specific surface area in accordance with an embodiment of the disclosure
Figure 4B:
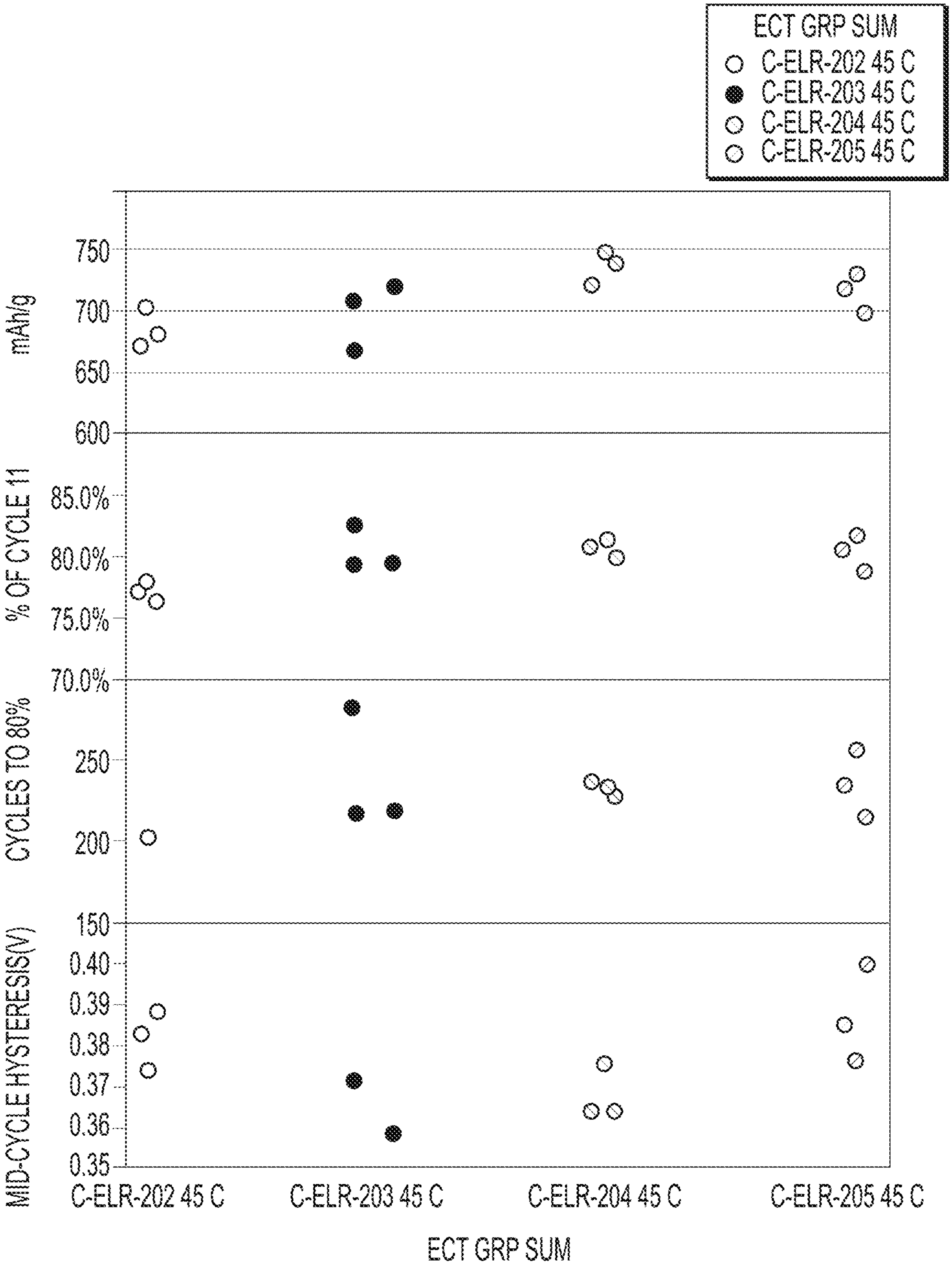

FIGS. 4A-4B shows the impact of FEC content in electrolyte on cycle stability at a relatively high temperature of 45° C. in accordance with an embodiment of the disclosure. As shown in FIGS. 4A-4B, cell performance with electrolyte containing MB as part of the LMP solvent is obtained at the relatively high temperature in combination with charging cells to a relatively high voltage of 4.4 V. Long term cycling data at 45° C. for full cells containing (nano)composite Si-comprising volume-changing anodes with electrolytes ELR-202 (30% FEC), ELR-203 (20% FEC), ELR-204 (10% FEC), and ELR-205 (5% FEC) showed a negative correlation with the n FEC % in contrast to room temperature performance as in FIGS. 3A-3B, with those electrolytes with lower percentages of FEC performing worse in terms of lower cycle stability. In other words, at room temperature, cells based on (nano)composite Si-comprising volume-changing anodes have a slight positive correlation between cell performance and FEC % as shown in FIGS. 3A-3B, whereas at a relatively high temperature of 45° C., cells based on (nano)composite Si-comprising volume-changing anodes were found to have a negative correlation between cell performance and FEC % as shown in FIGS. 4A-4B. In particular, in FIGS. 4A-4B, the cells with the lowest percentage of FEC (ELR-205) performed the best with regard to capacity retention, mid-cycle hysteresis, and estimated cycles to 80% of initial capacity (e.g., indicating that FEC gassing may be a concern at higher temperatures).

Figure 5:
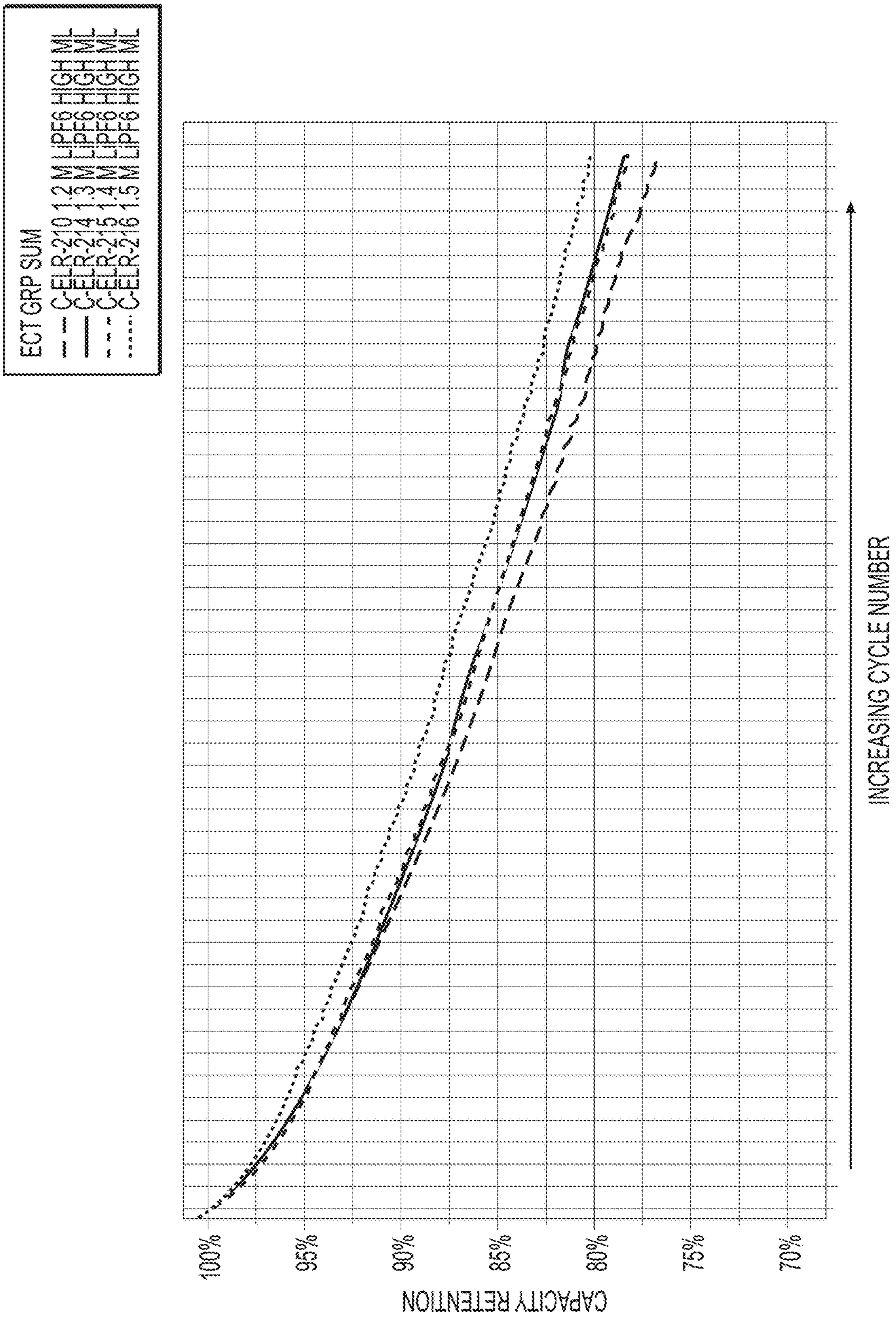
FIG. 5 illustrates long term cycling data at room temperature for full cells of the (nano)composite Si-comprising volume-changing anodes at high mass loading (approximately 5 mg-anode/$cm^2$) with LCO cathodes and with electrolytes ELR-210 (1.2 M $LiPF_6$), ELR-214 (1.3 M $LiPF_6$), ELR-215 (1.4 M $LiPF_6$), and ELR-216 (1.5 M $LiPF_6$) in accordance with an embodiment of the disclosure.
Figure 6:
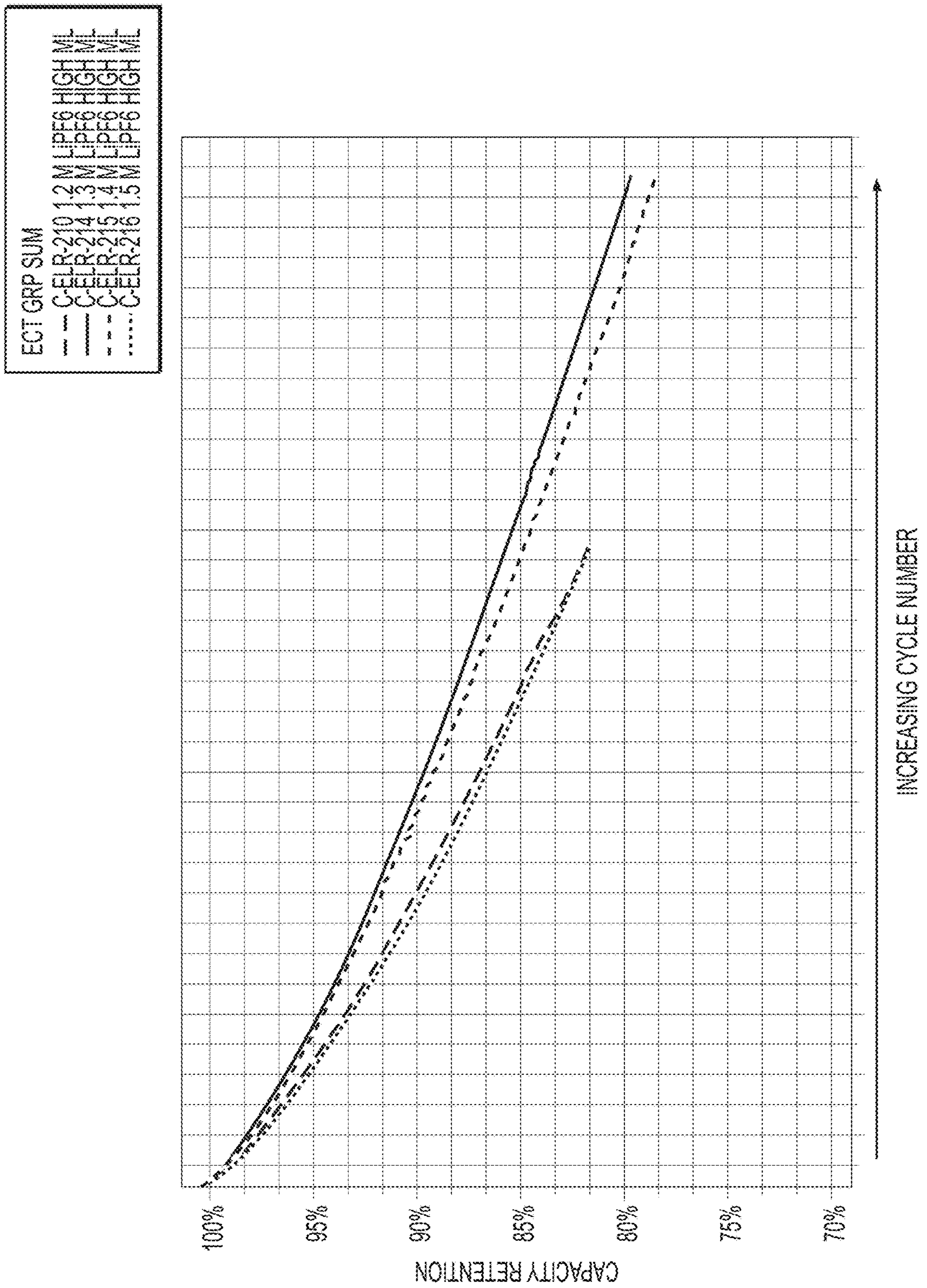
FIG. 6 shows illustrative examples of long term cycling data at room temperature for full cells of the (nano)composite Si-comprising volume-changing anodes at low mass loading (approximately 2 mg-anode/$cm^2$) with LCO cathodes and with electrolytes ELR-210 (1.2 M $LiPF_6$), ELR-214 (1.3 M $LiPF_6$), ELR-215 (1.4 M $LiPF_6$), and ELR-216 (1.5 M LiPF6) in accordance with an embodiment of the disclosure.

FIGS. 5-6 illustrate different impacts of varying the MN Li salt content in the example electrolyte compositions on cell performance in accordance with embodiments of the present disclosure, where the cell comprises high voltage LCO (charged to around 4.4V vs. Li/Li+ in these examples) and a (nano)composite Si-comprising volume-changing anode with low specific surface area of the active (nano) composite particles (approximately 5 $m^2/g$). In the embodiments of FIGS. 5-6, the MN Li salt used in the example electrolyte composition is $LiPF_6$. FIGS. 5-6 demonstrate that cells with high anode mass loading coatings (and correspondingly high reversible areal capacity loadings, e.g., greater than around 4 $mAh/cm^2$) may be enhanced by higher salt concentrations. The effect of varying the salt concentration in a series of electrolytes is shown in FIGS. 5-6 with respect to full cells with coatings of the (nano)composite Si-comprising volume-changing anodes (low mass loadings of approximately 2 $mg\text{-anode}/cm^2$ and approximately 5 $mg\text{-anode}/cm^2$) vs. LCO cathodes; cells cycling between 2.5V and 4.4V at C/2 rate. The MN Li salt concentration in FIGS. 5-6 was varied from 1.2 M to 1.5 M.

FIG. 5 shows illustrative examples of long term cycling data at room temperature for full cells of the (nano)composite Si-comprising volume-changing anodes at high mass loading (approximately 5 $mg\text{-anode}/cm^2$) with LCO cathodes and with electrolytes ELR-210 (1.2 M $LiPF_6$), ELR-214 (1.3 M $LiPF_6$), ELR-215 (1.4 M $LiPF_6$), and ELR-216 (1.5 M $LiPF_6$) in accordance with an embodiment of the disclosure. FIG. 5 demonstrates a positive correlation between the tested performance metrics and the salt concentration in the electrolyte. In particular, capacity retention, mid-cycle hysteresis, and cycle life projections were all found to be improved when moving from ELR-210 (1.2 M $LiPF_6$) to ELR-216 (1.5 M $LiPF_6$).

FIG. 6 shows illustrative examples of long term cycling data at room temperature for full cells of the (nano)composite Si-comprising volume-changing anodes at low mass loading (approximately 2 $mg\text{-anode}/cm^2$) with LCO cathodes and with electrolytes ELR-210 (1.2 M $LiPF_6$), ELR-214 (1.3 M $LiPF_6$), ELR-215 (1.4 M $LiPF_6$), and ELR-216

($1.5$ M $LiPF_6$) in accordance with an embodiment of the disclosure. In FIG. 6, the positive correlation between the tested performance metrics and salt concentration in the electrolyte is also seen, albeit to a lesser extent. In FIG. 6, long term cycling data at room temperature for full cells of the disclosed material (approximately 2 $mg/cm^2$) with LCO cathodes and with electrolytes ELR-210 (1.2 M $LiPF_6$), ELR-214 (1.3 M $LiPF_6$), ELR-215 (1.4 M $LiPF_6$), and ELR-216 (1.5 M $LiPF_6$) show performance improvements up to 1.4 M $LiPF_6$, without significant gains above that concentration. In particular, capacity retention, mid-cycle hysteresis, and cycle life projections are each improved for cells containing ELR-214 (1.3 M $LiPF_6$) to ELR-214 (1.4 M $LiPF_6$) vs. the cells containing 1.2 M $LiPF_6$ electrolyte.

Certain conventional Li-ion battery electrolytes may contain only a combination of linear and cyclic carbonates as the co-solvents, each of which may exhibit melting points above minus (−) 60° C. However, as discussed above, the use of LMP co-solvents in the electrolyte may be advantageous in certain applications, such as when used in conjunction with (nano)composite Si-comprising volume-changing anodes.

For example, the use of methyl butyrate (MB) and other low melting point esters (including those having 5 carbon atoms in the backbone) in electrolyte in accordance with one or more embodiments of the present disclosure may yield better performance at both low temperatures, room temperatures, and even high temperatures (e.g., despite the negative reputation esters have for gassing and poor performance at higher temperatures, and expected poor performance at high voltages).

Figure 7:
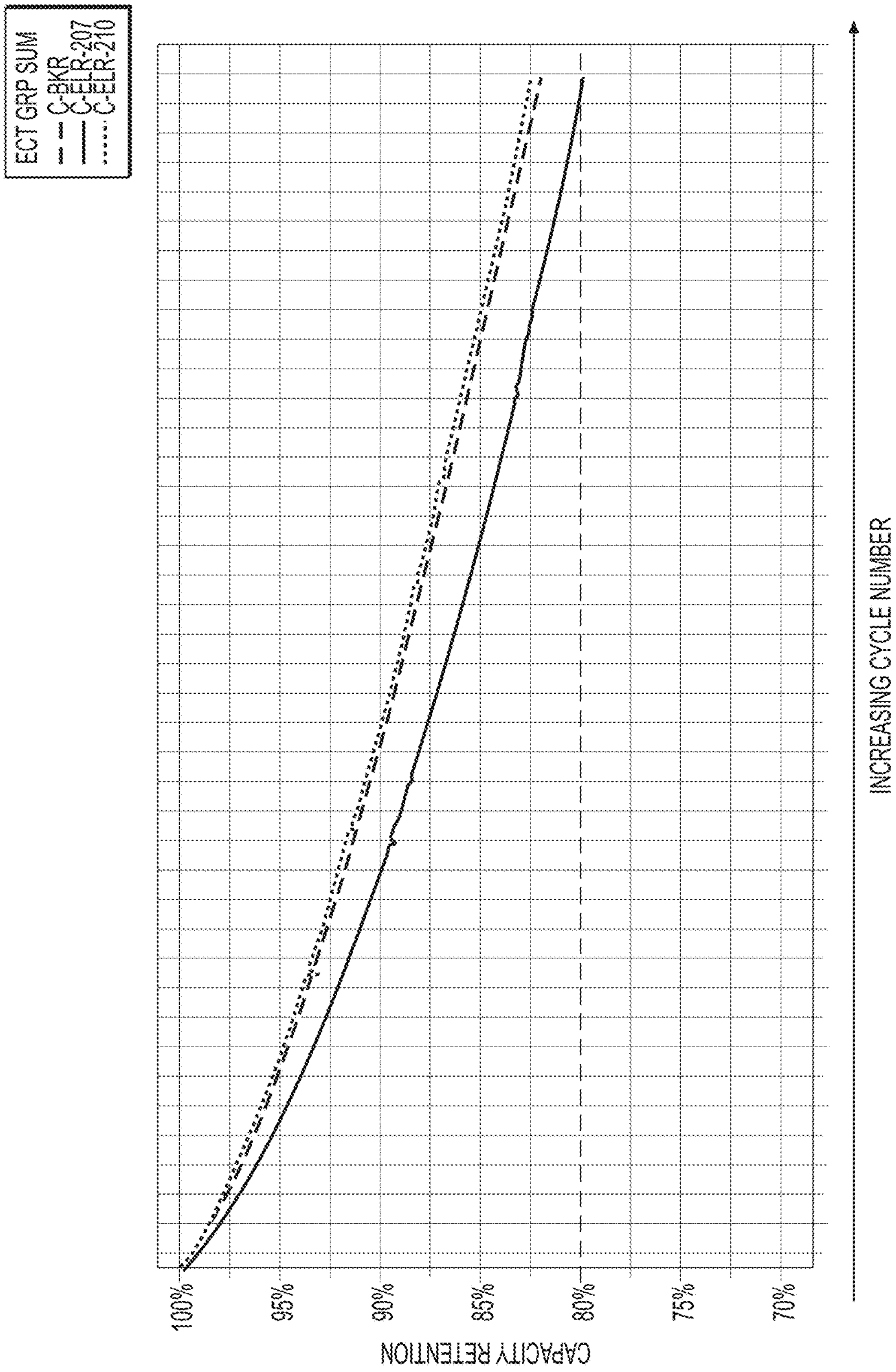
FIG. 7 illustrates different impacts of varying the LMP co-solvent %, in combination with linear carbonate co-solvents, in example electrolyte compositions on cell performance, where the cell comprises high voltage LCO and a (nano)composite Si-comprising volume-changing anode with low specific surface area of the active (nano)composite particles (approximately 5 $m^2$/g) in accordance with an embodiment of the disclosure.

FIG. 7 illustrates different impacts of varying the LMP co-solvent % (e.g., MB %), in combination with linear carbonate co-solvents, in the example electrolyte compositions on cell performance, where the cell comprises high voltage LCO and a (nano)composite Si-comprising volume-changing anode with low specific surface area of the active (nano)composite particles (approximately 5 $m^2/g$) in accordance with an embodiment of the disclosure. In this illustrative example, $LiPF_6$ was used as the MN Li salt. Cells (with an anode mass loading of approximately 2 $mg/cm^2$) were cycled between 2.5V and 4.4V at C/2 at a relatively high temperature of 45° C. Long term cycling data at 45° C. for full cells with electrolytes BKR (20 vol. % EMC/58 vol. % MB), ELR-207 (78 vol. % DEC), and ELR-210 (20% DEC/58% MB) surprisingly showed no strong performance dependence on the concentration of MB in the electrolyte in spite of the combination of high cell charge voltage and high cycling temperature (where one may intuitively expect cells with high MB content might rapidly fail). Under these test conditions, capacity retention, mid-cycle hysteresis, and cycle life projections suffered no particular disadvantages despite the use of electrolytes containing MB.

While several embodiments are described above as providing particular advantages with respect to electrolyte use in certain (nano)composite anodes that experience certain volume changes during cell cycling, it will be appreciated that other types and arrangements of electrodes (including both anodes and cathodes) may similarly benefit from the electrolyte formulations and combinations disclosed herein. For example, other embodiments may be directed to electrolytes for use with other high-capacity anode materials (e.g., anode materials with a theoretical specific capacity above 600 mAh/g) or with various types of cathode materials, including high-voltage cathode materials, conversion-type cathode materials, and so on.

In various embodiments of the present disclosure, the nanocomposite particles may generally be of any shape (e.g., near-spherical, cylindrical, plate-like, have a random shape, etc.) and of any size. The maximum size of the particle may depend on the rate performance requirements, on the rate of the ion diffusion into the partially filled particles, and/or on other parameters.

Some aspects of this disclosure may also be applicable to conventional intercalation-type electrodes and provide benefits of improved rate performance or improved stability, particularly for electrodes with medium and high capacity loadings (e.g., 2-10 $mAh/cm^2$).

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of forming a Li-ion battery cell, the method comprising:

assembling the Li-ion battery cell comprising an anode electrode, a cathode electrode, a separator electrically separating the anode electrode and the cathode electrode, and an electrolyte ionically coupling the anode electrode and the cathode electrode;

charging and/or discharging the Li-ion battery cell to a state in which the anode electrode is partially or fully expanded; and curing the Li-ion battery cell at an elevated temperature in a range of around 30° C. to around 100° C., wherein at least part of the curing occurs while the anode electrode is partially or fully expanded, wherein:

the anode electrode has a capacity loading in a range of 2 $mAh/cm^2$ to about 10 $mAh/cm^2$ and comprises anode particles including an active material and having an average particle size in a range of about 0.2 microns to about 40 microns, the active material comprising silicon or an alloy thereof;

the electrolyte comprises a Li-ion salt composition and an electrolyte solvent composition;

the electrolyte solvent composition comprises (a) one or more ester compounds, (b) a fluorinated solvent compound, and (c) a cyclic carbonate other than the fluorinated solvent compound;

each of the one or more ester compounds has a melting point below about −70° C. and a boiling point above +70° C.; and each of the fluorinated solvent compound and the cyclic carbonate has a melting point above about −60° C.

2. The method of claim 1, wherein the capacity loading is in a range of 3 $mAh/cm^2$ to about 10 $mAh/cm^2$.

3. The method of claim 2, wherein the capacity loading is in a range of 3.5 $mAh/cm^2$ to about 10 $mAh/cm^2$.

4. The method of claim 3, wherein the capacity loading is in a range of 4 $mAh/cm^2$ to about 10 $mAh/cm^2$.

5. The method of claim 1, wherein a volume fraction of the one or more ester compounds in the electrolyte solvent composition ranges between about 20 vol. % and about 80 vol. %.

6. The method of claim 5, wherein the volume fraction ranges between about 30 vol. % and about 70 vol. %.

7. The method of claim 6, wherein the volume fraction ranges between about 40 vol. % and about 60 vol. %.

8. The method of claim 1, wherein at least a majority by vol. % of the one or more ester compounds have a chemical formula of $C_5H_{10}O_2$.

9. The method of claim 1, wherein the fluorinated solvent compound is fluoroethylene carbonate (FEC).

10. The method of claim 9, wherein a volume fraction of the FEC in the electrolyte solvent composition ranges between about 5 vol. % and about 30 vol. %.

11. The method of claim 1, wherein the electrolyte solvent composition additionally comprises a linear carbonate other than the fluorinated solvent compound, the linear carbonate having a melting point above about −60° C., a volume fraction of the linear carbonate in the electrolyte solvent composition being in a range of about 15 vol. % to about 30 vol. %.

12. The method of claim 11, wherein the linear carbonate is selected from diethyl carbonate (DEC), ethyl methyl carbonate (EMC), and dimethyl carbonate (DMC).

13. The method of claim 1, wherein the cyclic carbonate is propylene carbonate (PC).

14. The method of claim 1, wherein the cyclic carbonate is vinylene carbonate (VC) and a volume fraction of the vinylene carbonate in the electrolyte solvent composition ranges between about 0.1 vol. % and about 3 vol. %.

15. The method of claim 1, wherein a concentration of the Li-ion salt composition in the electrolyte is in a range of about 1.0 M to about 2.4 M.

16. The method of claim 1, wherein the Li-ion salt composition comprises one or more of: lithium hexafluorophosphate ($LiPF_6$), lithium bix(oxalato)borate (LiBOB), and lithium bis(fluorosulfonyl)imide (LiFSI).

17. The method of claim 1, wherein the electrolyte solvent composition comprises at least one nitrile compound, at a volume fraction of less than about 5 vol. % of the electrolyte solvent composition.

18. The method of claim 17, wherein the at least one nitrile compound comprises a dinitrile compound.

19. The method of claim 18, wherein the dinitrile compound is selected from succinonitrile, adiponitrile, and glutaronitrile.

20. The method of claim 1, wherein the electrolyte solvent composition comprises a sulfur-comprising organic additive and/or a boron-comprising organic additive.

21. The method of claim 1, wherein the anode particles have a specific surface area in a range of about 0.3 $m^2/g$ to about 60 $m^2/g$.

22. The method of claim 1, wherein the Li-ion battery cell exhibits a charging potential of at least about 4.3V.

23. The method of claim 1, wherein the anode particles comprise composite particles comprising silicon.

* * * * *